(12) United States Patent
Neil et al.

(10) Patent No.: US 10,387,769 B2
(45) Date of Patent: Aug. 20, 2019

(54) HYBRID MEMORY CELL UNIT AND RECURRENT NEURAL NETWORK INCLUDING HYBRID MEMORY CELL UNITS

(71) Applicants: SAMSUNG ELECTRONICS CO., LTD., Suwon-si (KR); UNIVERSITAET ZUERICH, Zurich (CH)

(72) Inventors: Daniel Neil, Zurich (CH); Shih-Chii Liu, Zurich (CH); Michael Pfeiffer, Boblingen (DE)

(73) Assignees: SAMSUNG ELECTRONICS CO., LTD., Suwon-si (KR); UNIVERSITAET ZUERICH, Zurich (CH)

(*) Notice: Subject to any disclaimer, the term of this patent is extended or adjusted under 35 U.S.C. 154(b) by 8 days.

(21) Appl. No.: 15/674,224

(22) Filed: Aug. 10, 2017

(65) Prior Publication Data

US 2018/0005107 A1  Jan. 4, 2018

Related U.S. Application Data

(63) Continuation-in-part of application No. 15/347,501, filed on Nov. 9, 2016, now Pat. No. 10,032,498.
(Continued)

(30) Foreign Application Priority Data

Jun. 30, 2016 (KR) .................. 10-2016-0082556

(51) Int. Cl.
*G11C 7/00* (2006.01)
*G06N 3/04* (2006.01)
(Continued)

(52) U.S. Cl.
CPC ......... *G06N 3/0481* (2013.01); *G06F 9/3834* (2013.01); *G06F 9/44557* (2013.01);
(Continued)

(58) Field of Classification Search
CPC . G06N 3/0481; G06F 9/3834; G06F 9/44557; G06F 9/5016
(Continued)

(56) References Cited

U.S. PATENT DOCUMENTS 5,224,066 A   6/1993  Jourjine
7,373,333 B2  5/2008  Ito et al.
(Continued)

OTHER PUBLICATIONS

Daniel Neil et al; "Phased LSTM: Accelerating Recurrent Network Training for Long or Event-based Sequences"; Proc. of NIPS; 2016; 9 pgs. total.

*Primary Examiner* — Connie C Yoha
(74) *Attorney, Agent, or Firm* — Sughrue Mion, PLLC

(57) ABSTRACT

A recurrent neural network including an input layer, a hidden layer, and an output layer, wherein the hidden layer includes hybrid memory cell units, each of the hybrid memory cell units including a first memory cells of a first type, the first memory cells being configured to remember a first cell state value fed back to each of gates to determine a degree to which each of the gates is open or closed, and configured to continue to update the first cell state value, and a second memory cells of a second type, each second memory cell of the second memory cells including a first time gate configured to control a second cell state value of the second memory cell based on phase signals of an oscillatory frequency, and a second time gate configured to control an output value of the second memory cell based on the phase signals, and each second memory cell of the second memory cells being configured to remember the second cell state value.

29 Claims, 21 Drawing Sheets

Related U.S. Application Data

(60) Provisional application No. 62/507,410, filed on May 17, 2017.

(51) Int. Cl.
    *G06N 3/063*     (2006.01)
    *G06F 15/82*     (2006.01)
    *G06F 9/38*     (2018.01)
    *G06F 9/445*     (2018.01)
    *G06F 9/50*     (2006.01)
    *G06N 3/08*     (2006.01)

(52) U.S. Cl.
    CPC ............ *G06F 9/5016* (2013.01); *G06F 15/82* (2013.01); *G06N 3/049* (2013.01); *G06N 3/0445* (2013.01); *G06N 3/063* (2013.01); *G06N 3/08* (2013.01)

(58) Field of Classification Search
USPC ................ 365/193; 704/232; 706/12, 25, 22
See application file for complete search history.

(56) References Cited

U.S. PATENT DOCUMENTS

| | | |
|---|---|---|
| 7,877,338 B2 | 1/2011 | Tani et al. |
| 9,263,036 B1 | 2/2016 | Graves |
| 10,032,498 B2 * | 7/2018 | Neil .................. G11C 11/54 |
| 2015/0170640 A1 | 6/2015 | Sak et al. |
| 2015/0215871 A1 | 7/2015 | Schillings et al. |
| 2016/0005391 A1 | 1/2016 | Agiomyrgiannakis et al. |
| 2016/0034812 A1 | 2/2016 | Gibson et al. |
| 2016/0098632 A1 * | 4/2016 | Sutskever ............ G06N 3/0445 706/25 |
| 2016/0099010 A1 | 4/2016 | Sainath et al. |
| 2016/0111108 A1 | 4/2016 | Erdogan et al. |
| 2016/0140434 A1 | 5/2016 | Yilmaz et al. |
| 2016/0140435 A1 | 5/2016 | Bengio et al. |
| 2016/0196488 A1 * | 7/2016 | Ahn .................... G06N 3/049 706/41 |
| 2017/0344829 A1 * | 11/2017 | Lan .................... G06T 7/0042 |

* cited by examiner

200

300

1420

HYBRID MEMORY CELL UNIT AND RECURRENT NEURAL NETWORK INCLUDING HYBRID MEMORY CELL UNITS

CROSS-REFERENCE TO RELATED APPLICATION

This application is a Continuation-in-Part of U.S. patent application Ser. No. 15/347,501, filed Nov. 9, 2016, which claims priority from Korean Patent Application No. 10-2016-0082556, filed on Jun. 30, 2016 in the Korean Intellectual Property Office, and claims benefit of U.S. Provisional Application No. 62/507,410, filed May 17, 2017, the disclosures of which are incorporated herein by reference in their entirety.

BACKGROUND

1. Field

Methods and apparatuses consistent with example embodiments relate to a hybrid memory cell unit and a recurrent neural network (RNN) including hybrid memory cell units.

2. Description of Related Art

Deep neural networks (DNNs) have been a dominant model for solving challenging issues in benchmarks of machine learning. Recurrent neural networks (RNNs) are a type of DNNs and may be implemented, for example, by training databases, computing resources or training algorithms.

RNNs include feedback connections, which may change states over time in response to inputs. Thus, RNNs may be used to analyze patterns in a time-evolving system.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a recurrent neural network including an input layer, a hidden layer, and an output layer, wherein the hidden layer includes hybrid memory cell units, each of the hybrid memory cell units including a first memory cells of a first type, the first memory cells being configured to remember a first cell state value fed back to each of gates to determine a degree to which each of the gates is open or closed, and configured to continue to update the first cell state value, and a second memory cells of a second type, each second memory cell of the second memory cells including a first time gate configured to control a second cell state value of the second memory cell based on phase signals of an oscillatory frequency, and a second time gate configured to control an output value of the second memory cell based on the phase signals, and each second memory cell of the second memory cells being configured to remember the second cell state value.

Each of the hybrid memory cell units may be configured to fully open the first time gate and the second time gate with respect to a predetermined percentage of the first memory cells.

When a ratio of a number of neuron indices to a total number of neurons included in each of the hybrid memory cell units exceeds the predetermined percentage, the first time gate and the second time gate may be further configured to be fully opened and set to a first value.

The hidden layer may include remaining neurons which remain after neurons included in each of the hybrid memory cell units are randomly dropped out by a random variable drawn from a uniform distribution between "0" to "1", and a number of the remaining neurons may be determined based on a sparsity threshold.

In the second memory cells including the remaining neurons, a value of a second parameter corresponding to a ratio of a duration of an open phase to an oscillation period of the oscillatory frequency may be identical to the sparsity threshold.

When the random variable is less than the sparsity threshold, the first time gate and the second time gate may be further configured to be set to a first value.

A periodic oscillation may be applied to the second memory cells, and the second memory cell may have a fixed phase relationship.

The periodic oscillation may be generated based on a first parameter corresponding to an oscillation period of the oscillatory frequency.

When a rounded value of a mod operation between a time for the second memory cells and an oscillation period of the second memory cells is zero, the first time gate and the second time gate may be further configured to be opened and set to a first value, and when the rounded value is not zero, the first time gate and the second time gate may be further configured to be closed.

When a current time exceeds a refractory end time in which a state of the first time gate and a state of the second time gate are changed from an off state or a refractory state to an on state, the first time gate and the second time gate may be further configured to be opened and set to a first value.

When the first time gate and the second time gate are set to the first value, the second memory cells may be further configured to update the second cell state value.

The recurrent neural network may be configured to receive input values sampled from a continuous input signal.

The first time gate may be controlled based on a first oscillatory frequency and the second time gate may be controlled based on a second oscillatory frequency.

The recurrent neural network may be further configured to receive a plurality of input values corresponding to a plurality of sampling rates, and each of the phase signals may include an open phase corresponding to a sampling rate of the plurality of sampling rates.

The first time gate and the second time gate may be further configured to operate based on an open phase including a rising phase in which a phase signal changes from a first state to a second state, and a falling phase in which the phase signal changes from the second state to the first state, and a closed phase in which the first state of the phase signal is maintained.

The first time gate may be further configured to update the second cell state value based on an input value of each of the hybrid memory cell units, in response to the phase signal being in the open phase, and maintain the second cell state value regardless of the input value in response to the phase signal being in the closed phase.

The second time gate may be further configured to update an output value of the second memory cells, in response to the phase signal being in the open phase.

Each of the phase signals may include a shaped pulse corresponding to a fraction of an oscillation period of the oscillatory frequency.

The first time gate and the second time gate may be further configured to be opened and closed based on at least one from among a first parameter corresponding to an oscillation period of the oscillatory frequency, a second parameter corresponding to a ratio of a duration of an open phase to the oscillation period, and a third parameter corresponding to a phase shift in the oscillatory frequency, and the open phase may include a rising phase in which a phase signal changes from a first state to a second state, and a falling phase in which the phase signal changes from the second state to the first state.

The first time gate may be further configured to be opened and closed based on first independent oscillations in the first time gate, and the second time gate may be further configured to be opened and closed based on second independent oscillations in the second time gate, and the first independent oscillations and the second independent oscillations may be specified by at least one from among the oscillation period, the ratio of the duration of the open phase to the oscillation period, or the phase shift.

The oscillation period, the ratio of the duration of the open phase to the oscillation period, and the phase shift may be trained in advance.

The hybrid memory cell units are configured to be selectively updated based on input values of hybrid memory cell units that are asynchronously sampled.

Each of the second memory cells may further include an input gate configured to determine a degree to which an input value of the second memory cell is reflected, a forget gate configured to determine a degree to which the second cell state value is forgotten, and an output gate configured to determine a degree to which the second cell state value is output, based on a determination of whether the second cell state value is to be maintained or updated, wherein the first time gate may be further configured to determine, based on the phase signals, whether the second cell state value is to be maintained or updated based on the degree to which the input value is reflected and the degree to which the second cell state value is forgotten, and wherein the second time gate may be further configured to determine, based on the phase signals, whether the output value is to be maintained or updated based on the degree to which the second cell state value is output.

The first time gate may be further configured to update the second cell state value based on the input value, and the second cell state value is controlled by a gating function of the forget gate.

The first time gate and the second time gate may be further configured to be opened and closed based on an oscillation parameterized by the first parameter, the second parameter, and the third parameter.

According to an aspect of another example embodiment, there is provided a hybrid memory cell unit including a first memory cells configured to remember a first cell state value fed back to each of gates to determine a degree to which each of the gates is open or closed, and configured to continue to update the first cell state value, and a second memory cells, each second memory cell of the second memory cells including a first time gate configured to control a second cell state value of the second memory cell based on a phase signal of an oscillatory frequency, and a second time gate configured to control an output value of the second memory cell based on the phase signal, and each second memory cell of the second memory cells being configured to remember the second cell state value.

The hybrid memory cell unit may be configured to fully open the first time gate and the second time gate with respect to a predetermined percentage of the first memory cells.

When a ratio of a number of neuron indices to a total number of neurons included in the hybrid memory cell unit exceeds the predetermined percentage, the first time gate and the second time gate may be further configured to be fully opened and set to a first value.

According to an aspect of another example embodiment, there is provided a recurrent neural network including an input layer, a hidden layer, and an output layer, wherein the hidden layer includes hybrid memory cell units, the hybrid memory cell units including a plurality of first memory cells configured to remember a first cell state value fed back to each of gates to determine a degree to which each of the gates is open or closed, and configured to continue to update the first cell state value, and a plurality of second memory cells including a plurality of first time gates and a plurality of second time gates, the second plurality of memory cells being configured to remember a second cell state value, wherein each second memory cell of the plurality of second memory cells includes a respective first time gate of the plurality of first time gates, the first time gate being configured to control the second cell state value of the second memory cell based on phase signals of an oscillatory frequency, and a respective second time gate of the plurality of second time gates, the second time gate being configured to control an output value of the second memory cell based on the phase signals.

BRIEF DESCRIPTION OF THE DRAWINGS

The above and other aspects of example embodiments will become apparent and more readily appreciated from the following detailed description of certain example embodiments, taken in conjunction with the accompanying drawings of which.

DETAILED DESCRIPTION

Figure 1:
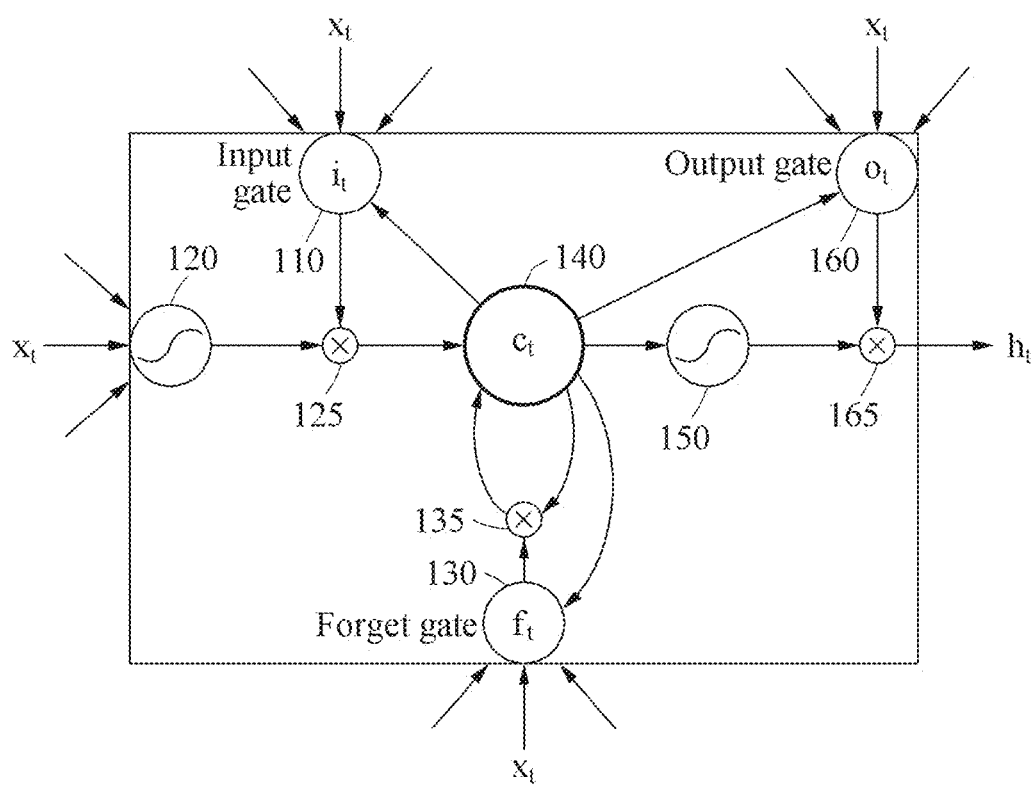
FIG. 1 is a diagram illustrating an architecture of a standard long short-term memory (LSTM) cell.

Reference will now be made in detail to example embodiments, examples of which are illustrated in the accompanying drawings, wherein like reference numerals refer to the like elements throughout. Example embodiments are described below to explain the present disclosure by referring to the figures.

Structural or functional descriptions of example embodiments in the present disclosure are intended for the purpose of describing example embodiments and the example embodiments may be implemented in various forms and may not be construed as being limited to those described in the present disclosure.

Although terms of "first" or "second" are used to explain various components, the components are not limited to the terms. These terms are used only to distinguish one component from another component. For example, a "first" component may be referred to as a "second" component, or similarly, the "second" component may be referred to as the "first" component within the scope of the right according to the concept of the present disclosure.

It may be noted that if it is described in the specification that one component is "connected," "coupled," or "joined" to another component, a third component may be "connected," "coupled," and "joined" between the first and second components, although the first component may be directly connected, coupled or joined to the second component. In addition, it may be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those understood by one of ordinary skill in the art. Terms defined in dictionaries used may be construed to have meanings matching contextual meanings in the related art and are not to be construed as an ideal or excessively formal meaning unless otherwise defined herein.

In the following description, a memory cell unit according to example embodiments may be included in a vehicle, a television (TV), a mobile phone or other electronic devices, and may be used for speech recognition, video analysis, time series analysis or natural language processing. Example embodiments may be implemented as various products, for example, personal computers (PC), laptop computers, tablet computers, smartphones, smart home appliances, or wearable devices. Hereinafter, example embodiments will be described in detail with reference to the accompanying drawings, and like reference numerals refer to the like elements throughout.

FIG. 1 is a diagram illustrating an architecture of a standard long short-term memory (LSTM) cell 100. In a recurrent neural network (RNN), an LSTM cell may retain inputs in a memory for a very long period of time in comparison to other memory elements.

Referring to FIG. 1, the LSTM cell 100 includes an input gate 110, a first sigmoid unit 120, a first multiplier 125, a forget gate 130, a second multiplier 135, an internal memory 140, a second sigmoid unit 150, an output gate 160 and a third multiplier 165.

For example, an element-wise product of a vector value output from a sigmoid unit (for example, a value limited to a range of "0" to "1" by a sigmoid function) and a vector value output from a gate may be transferred to the internal memory 140. The input gate 110, the forget gate 130 and the output gate 160 may be configured to determine how much the vector value output from the sigmoid unit passes the input gate 110, the forget gate 130 and the output gate 160, and accordingly the input gate 110, the forget gate 130 and the output gate 160 may be called "gates."

The input gate 110 may determine a degree to which an input value $x_t$ that is input to the input gate 110 is reflected based on a gating function it. The input value $x_t$ may be an input feature vector or an input vector. The input gate 110 may determine a degree to which an input vector value is used to calculate a new hidden state value.

The input gate 110 may receive an input value along with a previous cell state value that is fed back. When a value close to zero is output from the input gate 110, the input gate 110 may block the value from being transferred or passing through the input gate 110 regardless of the input value.

The input gate 110 may be a hyperbolic tangent "tan h" as a gate activation function. An output value of the input gate 110 may indicate a number of elements (for example, input values) that are to pass. For example, a value of "0" output from the input gate 110 may indicate that no input value passes, and a value of "1" output from the input gate 110 may indicate that all the elements of an input value pass.

The first sigmoid unit 120 may be represented by $y=s(\Sigma w_i x_i)$. In $y=s(\Sigma w_i x_i)$, s denotes a squashing function, for example, a logistic function, $x_i$ denotes an input value, and $w_i$ denotes a weight for the input value. A sigmoid unit may be referred to as a "sigmoid layer" or a "sigmoid neural network layer."

The first multiplier 125 may multiply an output value of the input gate 110 and an output value of the first sigmoid unit 120 and may transfer a value obtained by the multiplying to the internal memory 140. The first multiplier 125 may perform an element-wise multiplying operation. The second multiplier 135 and the third multiplier 165 may also perform the element-wise multiplying operation.

The forget gate 130 may determine how much the cell state value is to be forgotten or remembered based on a gating function $f_t$. For example, the forget gate 130 may determine a degree to which the cell state value is forgotten.

When the forget gate 130 outputs a value close to zero, the value may be forgotten regardless of a value that is remembered as a cell state value $c_t$. For example, when a value close to zero is output from the forget gate 130, the forget gate 130 may block the cell state value from being transferred again to the internal memory 140.

The second multiplier 135 may multiply an output value of the forget gate 130 and the cell state value $c_t$ of the internal memory 140. The internal memory 140 may receive a multiplication result of the second multiplier 135.

The internal memory 140 may store the cell state value $c_t$. The internal memory 140 may generate a candidate group of current cell state values that are to be added to previous cell state values, that is, generate a vector of candidate state values. The internal memory 140 may add a product of a previously stored value of a memory (for example, a previous cell state value) and the output value of the forget gate 130, to a product of a newly calculated hidden state value and the output value of the input gate 110. The adding may be performed to add a new input value to a previous value (for example, a previous cell state value) of the internal memory 140. For example, when the forget gate 130 has a value of "0," all previous values of the internal memory 140 may be ignored. When the input gate 110 has a value of "0," all new input values may be ignored.

For example, the internal memory 140 may perform an addition operation, for example, $y=\Sigma w_i x_i$. Because an output value (for example, the cell state value $c_t$) of the internal memory 140 is not squashed along with an output value of a sigmoid unit, the same value may be remembered during a large number of time steps and the value may not be decayed.

The cell state value $c_t$ may be fed back to the internal memory 140 through the second multiplier 135. Thus, the LSTM cell 100 may continue to remember the cell state value $c_t$ during a period of time in which the forget gate 130 allows. The cell state value $c_t$ may be fed back to three gates, that is, the input gate 110, the forget gate 130 and the output gate 160, for gating decisions.

The second sigmoid unit 150 may operate similarly to the first sigmoid unit 120. The second sigmoid unit 150 may also be a hyperbolic tangent "tan h" as a gate activation function."

The second sigmoid unit 150 may receive the cell state value $c_t$ from the internal memory 140 and may pass at least a portion of the cell state value $c_t$.

The output gate 160 may receive the cell state value $c_t$ from the internal memory 140 and may determine a degree to which the cell state value $c_t$ is to be output, that is, a degree to which a current cell state value is to be output from the LSTM cell 100.

The third multiplier 165 may output a value ht obtained by multiplying an output value of the output gate 160 and an output value of the second sigmoid unit 150. The output value ht may be referred to as a "hidden state output vector" or a "hidden output vector."

Each of the input gate 110, the forget gate 130 and the output gate 160 may determine how many times a gate is open or closed when an input value is input, that is, determine a degree to which an input value is reflected by selectively passing the input value. The degree to which a gate is open or closed may be represented by an analog value between "0" and "1" instead of a digital value, for example, "0" and "1."

Elements located on a straight line connecting the input feature vector $x_t$ input to the LSTM cell 100 to the hidden output vector $h_t$ may calculate values applied as input values to a memory of the LSTM cell 100 based on a condition.

An update equation of gating functions, the cell state value $c_t$ and the hidden output vector $h_t$ of the LSTM cell 100 may be expressed as shown in Equations 1 through 5 below.

$$i_t = \sigma_i(x_t W_{xi} + h_{t-1} W_{hi} + w_{ci} \odot c_{t-1} + b_i) \tag{1}$$

$$f_t = \sigma_f(x_t W_{xf} + h_{t-1} W_{hf} + w_{cf} \odot c_{t-1} + b_f) \tag{2}$$

$$c_t = f_t \odot c_{t-1} + i_t \odot \sigma_c(x_t W_{xc} + h_{t-1} W_{hc} + b_c) \tag{3}$$

$$o_t = \sigma_o(x_t W_{xo} + h_{t-1} W_{ho} + w_{co} \odot c_t + b_o) \tag{4}$$

$$h_t = o_t \odot \sigma_h(c_t) \tag{5}$$

In Equations 1 through 5, $x_t$ denotes the input feature vector and $h_t$ denotes the hidden output vector. Also, $b_i$, $b_f$, and $b_o$ denote a bias value of the input gate 110, a bias value of the forget gate 130 and a bias value of the output gate 160, respectively. The input gate 110, the forget gate 130 and the output gate 160 may have sigmoidal nonlinearities $\sigma_i$, $\sigma_f$, and $\sigma_o$ and tan h nonlinearities with weight parameters $W_{xi}$, $W_{hi}$, $W_{xf}$, $W_{hf}$, $W_{xo}$ and $W_{ho}$. Also, $h_{t-1}$ denotes a previous output value and $c_{t-1}$ denotes a previous cell state value.

The LSTM cell 100 may use gating functions $i_t$, $f_t$, and $o_t$ that represent the input gate 110, the forget gate 130 and the output gate 160 at a time t, respectively. The cell state value $c_t$ may be a cell activation vector.

The cell state value $c_t$ may be updated by a fraction of the previous cell state value $c_{t-1}$ that is controlled by the gating function $f_t$ of the forget gate 130. $b_c$ denotes a bias value for the cell state value $c_t$.

The cell state value $c_t$ may be generated by an element-wise product or Hadamard product, denoted by $\odot$, of the gating function $i_t$ of the input gate 110 and a cell state value nonlinearity $\sigma_c$. Optional peephole connection weights $w_{ci}$, $w_{cf}$ and $w_{co}$ may have a further influence on an operation of the input gate 110, the forget gate 130 and the output gate 160.

To minimize a total error of the LSTM cell 100 for a set of training sequences, an iterative gradient descent, for example, backpropagation through time, may be used to change each weight in proportion to a differential coefficient or a derivative. A major problem with a gradient descent for a standard RNN is that error gradients exponentially quickly vanish with a size of a time lag between events.

However, when error values are back-propagated from an output in the LSTM cell 100, an error may be trapped in a memory portion of the LSTM cell 100, which may be referred to as an "error carousel," which continuously supplies errors to each of gates until the memory portion of the LSTM cell 100 is trained to cut off error value(s). Thus, regular backpropagation may be effective in training of the LSTM cell 100 to remember values for very long durations.

To execute inference, an RNN may perform processing in a time-stepped scheme so that an entire network may be updated simultaneously on each clock tick, which may be non-ideal for reasons described below.

First, a full update of all units in the RNN at all time steps may be performed, which may be wasteful for an LSTM cell that does not need to be updated.

Second, integration of inputs from sensors that run in a continuous time may be enabled. Currently dominant schemes of integrating inputs may lose potentially precise timing information.

Third, it may be impossible to integrate inputs of a plurality of sensors with different timings, which is an issue that is to be taken into consideration based on a proliferation of multi-sensor platforms in next-generation systems, for example, the Internet of Things (IoT) and autonomous cars and drones.

Even though fixed time steps are perfectly suitable for many RNN applications, there are several scenarios in which constant update rates impose constraints that affect an accuracy and efficiency of an RNN. Many real-world tasks for autonomous vehicles or robots may integrate inputs from various sensors, for example, for vision, audition, distance measurements, or gyroscopes. Each sensor may have a data sampling rate of each sensor, and short time steps may be used to deal with sensors with high sampling frequencies. However, an unnecessarily higher computational load and power consumption may occur so that all units in a network may be updated with a single time step. An interesting new application area may be processing of event-based sensors that are data-driven, and record stimulus changes in the world with short latencies and accurate timing.

Processing asynchronous outputs of sensors with time-stepped models may use high update frequencies, thereby counteracting potential power savings of event-based sensors. Biological neurons may communicate with spikes, and accordingly may perform asynchronous, event-triggered updates in a continuous time. A new RNN model for processing inputs sampled at asynchronous times may be used.

Figure 2:
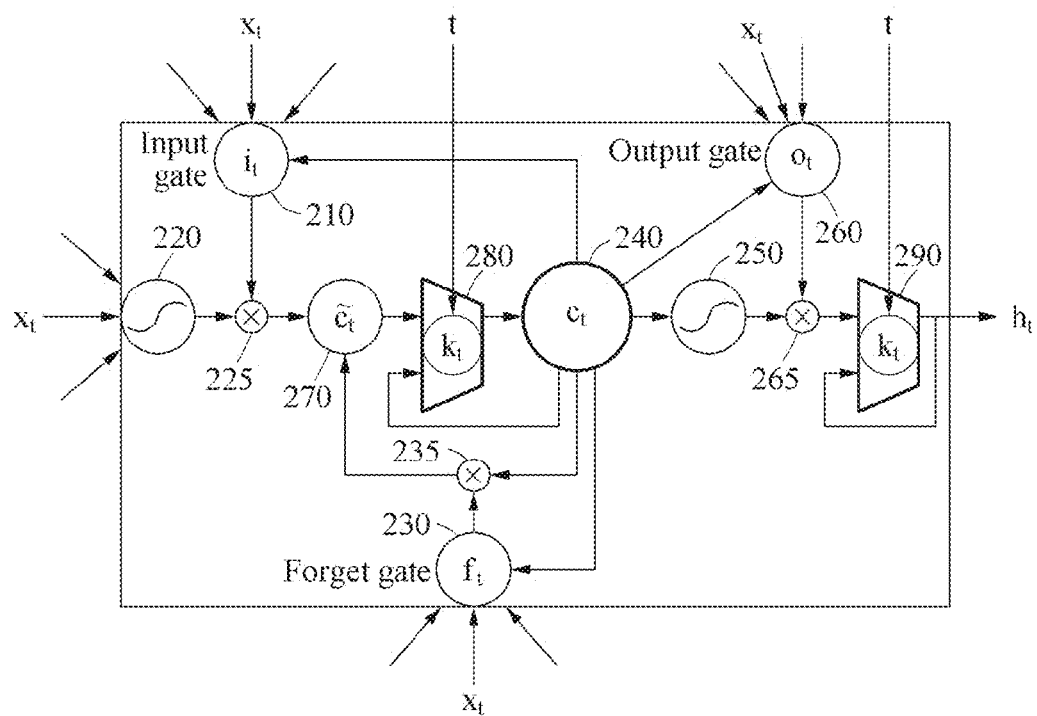
FIG. 2 is a diagram illustrating an architecture of a memory cell according to an example embodiment.

FIG. 2 is a diagram illustrating an architecture of a memory cell 200 according to an example embodiment. Referring to FIG. 2, the memory cell 200 includes an input gate 210, a first sigmoid unit 220, a first multiplier 225, a forget gate 230, a second multiplier 235, a first internal memory 240, a second sigmoid unit 250, an output gate 260, a third multiplier 265, a second internal memory 270, a first time gate 280 and a second time gate 290.

An operation of each of the input gate 210, the first sigmoid unit 220, the first multiplier 225, the forget gate 230, the second multiplier 235, the first internal memory 240, the second sigmoid unit 250, the output gate 260 and the third multiplier 265 may be the same as an operation of each of the input gate 110, the first sigmoid unit 120, the first multiplier 125, the forget gate 130, the second multiplier 135, the internal memory 140, the second sigmoid unit 150, the output gate 160 and the third multiplier 165 of FIG. 1, and accordingly further description thereof is not repeated and a difference between operations will be described below.

Unlike the LSTM cell 100 of FIG. 1, the memory cell 200 includes at least one time gate, for example, the first time gate $k_t$ 280 and the second time gate $k_t$ 290. The first time gate 280 and the second time gate 290 may control either one or both of a cell state value and an output value based on a phase signal of an oscillatory frequency. For example, the first time gate 280 and the second time gate 290 may control a degree to which the output value is output and determine whether the cell state value is to be maintained or updated, based on the phase signal. The first time gate 280 and the second time gate 290 may have a gating function of $k_t$.

The phase signal may be generated by an oscillator. The phase signal may be represented by a timestamp t. Because a control based on a phase signal may be regarded as a control based on a modulation of the phase signal, a time gate may be referred to as a "time modulation gate." Also, the memory cell 200 may perform a control based on a phase signal, and accordingly may be referred to as a "Phased LSTM cell" or "PLSTM cell."

The first internal memory 240 may store a first cell state value $c_t$, and the second internal memory 270 may store a second cell state value $\tilde{c}_t$ affected by the forget gate 230. The first time gate 280 may selectively output one among two inputs, that is, the first cell state value $c_t$ and the second cell state value $\tilde{c}_t$, based on a phase signal t. The first time gate 280 may operate as a 2-to-1 multiplexer (MUX) or a selector.

The first time gate 280 may determine whether the cell state value is to be maintained or updated, based on the phase signal t. For example, when the phase signal t corresponds to an open phase, the first time gate 280 may update an output value to a new value (for example, the second cell state value $\tilde{c}_t$) based on an input value of the memory cell 200. When the phase signal t corresponds to a closed phase, the first time gate 280 may maintain the cell state value (for example, the first cell state value $c_t$).

When the phase signal t corresponds to the open phase, a value transferred by the forget gate 230 to the first internal memory 240 may be updated. In an example, when the forget gate 230 outputs a value of "0," the cell state value may be decayed so that a value close to "0" may be transferred to the second internal memory 270. In another example, when the forget gate 230 outputs a value of "1," a previous cell state value may be transferred to the second internal memory 270, instead of being decayed. Thus, the first cell state value $c_t$ may be updated by an input value $x_t$ of the memory cell 200 and by the second cell state value $\tilde{c}_t$ controlled by a gating function $f_t$ of the forget gate 230.

The second time gate 290 may determine whether a value output from the output gate 260 is to be maintained or updated, based on the phase signal. The second time gate 290 may receive, as inputs, an output value of the third multiplier 265 and an output value $h_t$ that is fed back. The second time gate 290 may output either the output value of the third multiplier 265 or the output value $h_t$, based on the phase signal.

The output gate 260 may output a value of "0" to "1" determined by, for example, a gating function $o_t$, a parameter or a bias value. The third multiplier 265 may output a result of multiplication of an output value of the second sigmoid unit 250 and the output value of the output gate 260.

The first time gate 280 and the second time gate 290 may function as shields to maintain an internal state of the memory cell 200 without a change. For example, in a closed phase that will be described with reference to FIG. 3, the first time gate 280 and the second time gate 290 may function to block external input(s). The first time gate 280 and the second time gate 290 may control operations of neurons included in the memory cell 200 in a multiplicative manner.

An operating phase of a time gate according to an example embodiment will be described with reference to FIG. 3.

The first cell state value $c_t$ and the hidden state output value $h_t$ of the memory cell 200 may be updated while the first time gate 280 and the second time gate 290 operate in the open phase. When the first time gate 280 and the second time gate 290 operate in the open phase, the cell state value may be updated based on the input value of the memory cell 200. When the first time gate 280 and the second time gate 290 operate in the closed phase, the cell state value may remain unchanged regardless of the input value.

For example, when the first time gate 280 and the second time gate 290 are set to zero, the neurons may not be updated. When the first time gate 280 and the second time gate 290 are set to a value close to "1," the neurons may be updated as a standard LSTM cell.

For example, opening and closing of the first time gate 280 and the second time gate 290 may be a periodic oscillation controlled by three parameters. The parameters may be referred to as "timing parameters."

The opening and closing of the first time gate 280 and the second time gate 290 may be controlled by, for example, any one or any combination of three parameters, for example, parameters $\tau$, $r_{on}$, and s. The parameter $\tau$ may represent an oscillation period and may be used to control a duration. The parameter $r_{on}$ may represent a time rate of a duration of the open phase to the oscillation period $\tau$, or an open ratio that is an average number of "on" states during the oscillation period $\tau$. The parameter s may represent a phase shift offset, that is, a phase shift of an oscillation for each memory cell 200.

The opening and closing of the first time gate 280 and the second time gate 290 may be controlled by rhythmic oscillations that are independent of each other in each time gate and that are specified by at least one parameter. The three parameters may be trained in advance in a training process.

The first time gate 280 and the second time gate 290 may be controlled by a parameterized oscillation.

To successfully propagate gradients based on a gradient descent scheme, an openness of a time gate $k_t$ may be calculated using a linearized formulation as shown in Equation 6 below.

$$\phi_t = \frac{(t-s) \bmod \tau}{\tau}, \quad (6)$$

$$k_t = \begin{cases} \frac{2\phi_t}{r_{on}}, & \text{if } \phi_t < \frac{1}{2}r_{on} \\ 2 - \frac{2\phi_t}{r_{on}}, & \text{if } \frac{1}{2}r_{on} < \phi_t < r_{on} \\ \alpha\phi_t, & \text{otherwise} \end{cases}$$

In Equation 6, $\phi_t$ denotes an auxiliary variable that represents a phase within a cycle of an oscillatory frequency. The auxiliary variable $\phi_t$ may be an auxiliary variable representing a percentage of a phase within a rhythmic cycle, ranging from 0% to 100% and may be used to track a position within the phase. Also, i denotes a neuron index and represents which parameters and variables are neuron-specific (for example, $\Phi_{i,t}$, $k_{i,t}$, $s_i$, $\tau_i$, and $r_{on,i}$) to a neuron i and which are global (for example, t and a) regardless of the neuron i.

Figure 3:
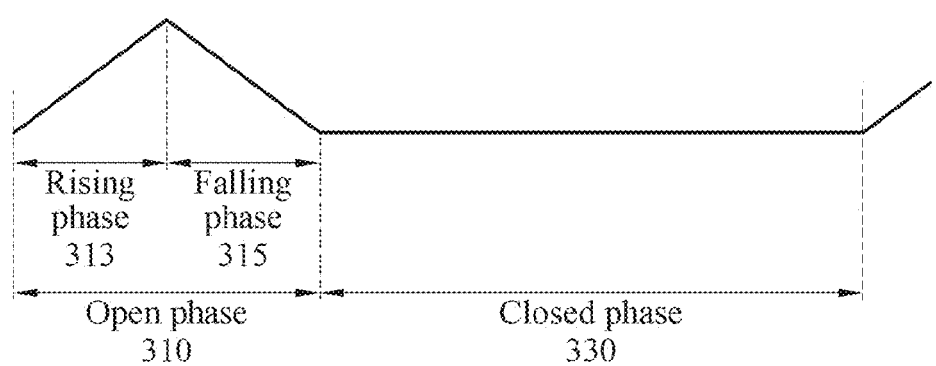
FIG. 3 is a diagram illustrating an operating phase of a time gate, according to an example embodiment.

FIG. 3 is a diagram illustrating an operating phase 300 of a time gate, according to an example embodiment. FIG. 3 illustrates an open phase 310 and a closed phase 330.

For example, an operation of the time gate may be specified in three piecewise phases, for example, a rising phase 313, a falling phase 315 and the closed phase 330.

The open phase 310 may include the rising phase 313 in which a phase signal changes from a first state to a second state during a first half of the open ratio $r_{on}$, and the falling phase 315 in which the phase signal changes from the second state to the first state during a second half of the open ratio $r_{on}$. The rising phase 313 and the falling phase 315 may be referred to as a "rising opening phase" and "falling opening phase," respectively. For example, the first state may correspond to a value of "0" or an "off" state and the second state may correspond to a value of "1" or an "on" state. Also, the open phase 310 may further include a phase in which the second state is maintained, between the rising phase 313 and the falling phase 315.

In the closed phase 330, the first state of the phase signal may be maintained.

For example, a phase signal in which a first state and a second state are reversed may be used. In this example, the second state of the phase signal may be maintained in the closed phase.

According to an example embodiment, a time gate may operate based on the open phase 310 and the closed phase 330. In the open phase 310, the time gate may update a PLSTM cell based on an input value. During the rising phase 313 and the falling phase 315, an external input value may have an influence on an internal state of the PLSTM cell. During the open phase 310, the time gate may update, for example, an output value and a cell state value of the PLSTM cell based on the input value.

In the closed phase 330, the time gate may maintain a previous value stored in the PLSTM cell without a change. During the closed phase 330, an output and the internal state of the PLSTM cell may not be affected by an external input.

The time gate may be controlled by a shaped pulse corresponding to a small fraction of an oscillation period of an oscillatory frequency. The time gate may be controlled by a parameterized oscillation and a frequency range in which an update of the PLSTM cell is performed during a fraction of the oscillation period. A shape of a pulse that controls opening of the time gate may not be restricted to a single formulation.

When the time gate operates in a closed phase, a previous state may be maintained. When the time gate is partially open, a balance between the previous state and a proposed update may be formed. When the time gate operates in a fully open phase, the time gate may function as an LSTM cell that does not include a time gate.

The time gate may be controlled by a continuous-time phase signal that allows the PLSTM cell to learn a natural rhythm of attention on different input streams that are input or sensed using, for example, a continuous-time vision sensor or an asynchronous pulse-generating vision sensor and/or auditory sensors).

The opening of the time gate may lead to an "on" phase for an update of the PLSTM cell, and closing of the time gate may lead to an "off" phase in which the PLSTM cell is not updated and the previous state is maintained.

Because an updating rate of the PLSTM cell may be lower than a data sampling rate, an amount of computation may be substantially less than a time-stepped network using the data sampling rate. Also, for event-based sensors, the PLSTM cell may act as a data-driven network that is updated only when new data arrives.

The PLSTM cell may achieve faster convergence than the LSTM cell on tasks that perform learning of long sequences, with an update imposed by an oscillation during a fraction of the oscillation period. Thus, the PLSTM cell may integrate inputs from sensors with arbitrary sampling rates, to process asynchronous sensory events that carry timing information. Also, the PLSTM cell may greatly enhance a performance of an RNN and may reduce complexity of computation.

Figure 5:
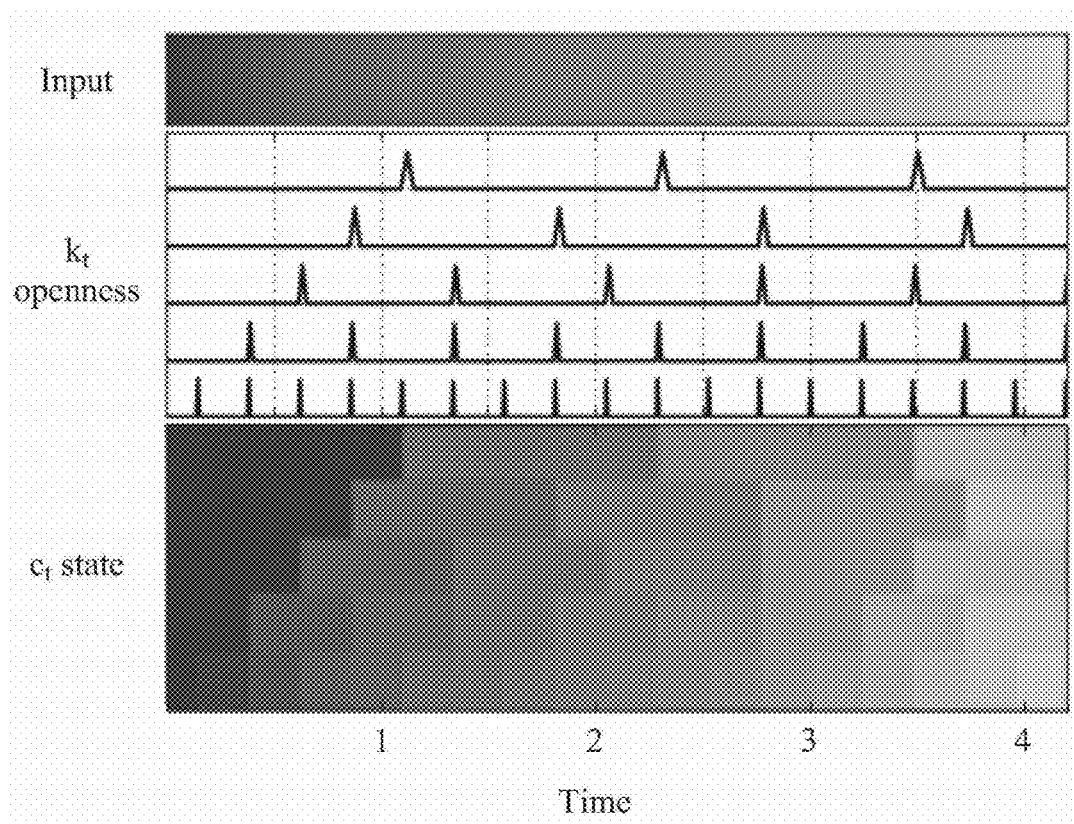
FIG. 5 is a diagram illustrating a change in a cell state value, based on opening and closing of time gates, according to an example embodiment.

An operation of the time gate will be further described with reference to FIG. 5. FIG. 5 illustrates a scheme by which an input flows in a time gate, is selectively blocked or allowed and is stored as a new state.

Figure 4:
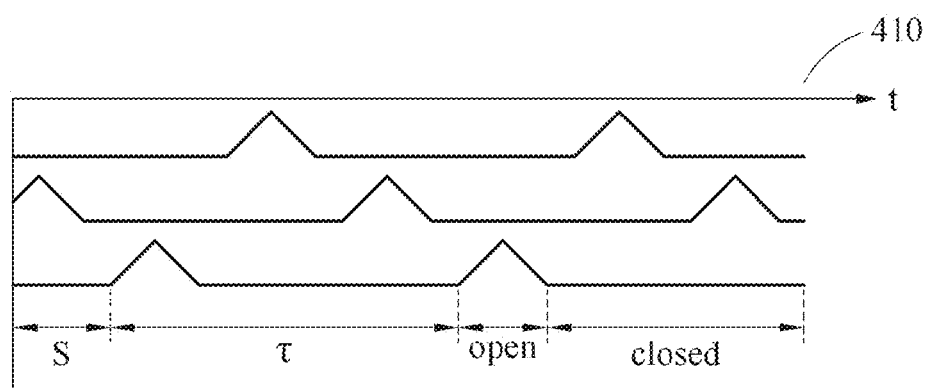
FIG. 4 is a diagram illustrating an operation of a recurrent neural network (RNN) including PLSTM cells in a continuous time, according to an example embodiment.
Figure 4:
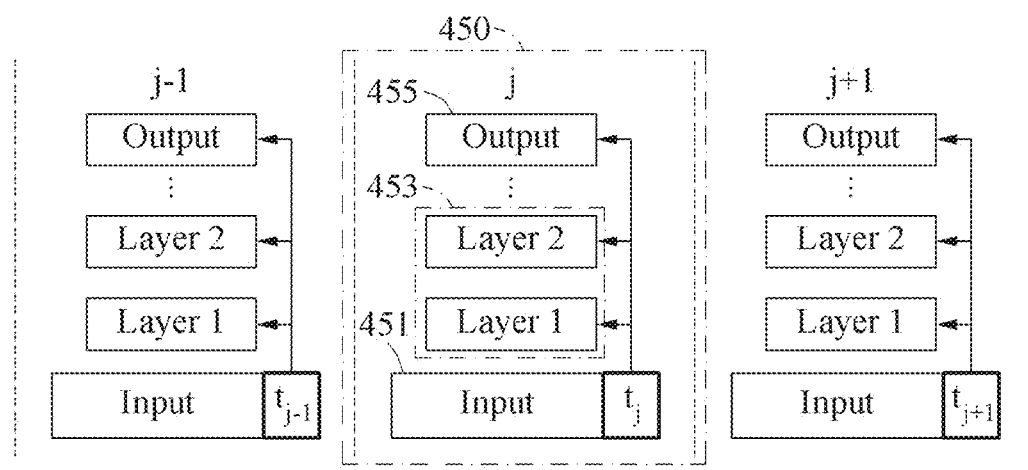

FIG. 4 is a diagram illustrating an operation of an RNN including PLSTM cells in a continuous time, according to an example embodiment. FIG. 4 illustrates a rhythmic oscillation 410 to time gates included in PLSTM cells and an RNN 450 including multiple layers with PLSTM cells.

The rhythmic oscillation 410 may include an oscillation period T and a phase shift s of time gates included in three different PLSTM cells. The rhythmic oscillation 410 may be defined at all time points t, which may allow irregularly-spaced time points to be used within a framework.

During a closed phase, a leak with a rate a may occur in a time gate. The leak may propagate gradient information during training even when the time gate is closed. Also, a linear slope of a gating function of $k_t$ during an open phase of the time gate may allow an effective transmission of error gradients. After training, the leak=0, and accordingly the time gate may not need to update PLSTM cells at all during the closed phase. Linear slopes of a rising phase and a falling phase may have constant gradients, and accordingly strong gradient information that allows rectified linear units (ReLUs) of a neural network to very efficiently train may be preserved.

The RNN 450 may include an input layer 451, a hidden layer 453 and an output layer 455. The hidden layer 453 may include a plurality of PLSTM cells that each includes at least one time gate described above.

Each of layers in the RNN 450 may receive a timestamp t corresponding to a current time (for example, no inter-layer delays). The timestamp t may correspond to a phase signal. The phase signal may be applied to layers (for example, the input layer 451, the hidden layer 453 and the output layer 455) that are updated at the same time.

Values input to the RNN 450 may be sampled from a continuous input signal. The values input to the RNN 450 may be sampled regularly and synchronously, or sampled irregularly and asynchronously.

At least one time gate included in each of the PLSTM cells in the RNN 450 may be controlled by different oscillation frequencies or the same oscillation frequency.

The RNN 450 may receive a plurality of input values with different sampling rates. Each of phase signals may include different open phases corresponding to the different sampling rates.

In the RNN 450, a PLSTM cell may be selectively updated at irregularly sampled points in time $t_j$. Because the updating is possible at irregularly sampled points in time, the RNN 450 may operate with even-driven, asynchronously sampled input data. In the present disclosure, cell states at the point in time $t_j$ (similarly to other gates and units) are denoted by $c_j=c_{tj}$, and a cell state at a previous point in time $t_{j-1}$ for updating is denoted by $c_{j-1}$.

Update equations for a PLSTM cell may be represented by adding a cell state update value $\tilde{c}_j$ by using a time gate and a hidden state update value $\tilde{h}_j$ controlled by a time gate, to the above-described Equations 1 through 5 that are standard LSTM equations, as shown in Equations 7 through 11 below.

$$i_j=\sigma_i(x_jW_{xi}+h_{j-1}W_{hi}+w_{ci}\odot c_{j-1}+b_i) \quad (7)$$

$$f_j=\sigma_f(x_jW_{xf}+h_{j-1}W_{hf}+w_{cf}\odot c_{j-1}+b_f) \quad (8)$$

$$c_j=k_j\odot \tilde{c}_j+(1-k_j)\odot c_{j-1},\ \tilde{c}_j=f_j\odot c_{j-1}+i_j\odot \sigma_c(x_jW_{xc}+h_{j-1}W_{hc}+b_c) \quad (9)$$

$$o_j=\sigma_o(x_jW_{xo}+h_{j-1}W_{ho}+w_{co}\odot \tilde{c}_j+b_o) \quad (10)$$

$$h_j=k_j\odot \tilde{h}_j+(1-k_j)\odot h_{j-1},\ \tilde{h}_j=o_j\odot \sigma_h(\tilde{c}_j) \quad (11)$$

Equations 7 through 11 may require a larger number of updates. However, a speed may be substantially increased when a considerable portion of neurons, that is, PLSTM cells, are skipped in a time step at runtime.

FIG. 5 is a diagram illustrating a change in a cell state value, based on opening and closing of time gates, according to an example embodiment. FIG. 5 illustrates an operation of a PLSTM cell based on a time, an input, kt openness of time gates and a cell state value ct.

A linearly increasing function may be used as an input. When the time gates operate in an open phase, inputs applied to the time gates may be updated as a new cell state and may be maintained until a next open phase.

Time gates included in different layers may be controlled by different oscillation frequencies or the same oscillation frequency. An open phase of a time gate included in a layer may be different from an open phase of a time gate included in another layer. An oscillation frequency range corresponding to a single layer may be different from an oscillation frequency range corresponding to another layer.

The time gates may have different oscillation periods τ, an identical phase shift s and an open ratio ron of "0.05."

The PLSTM cell may have a rate of a memory decay. For example, a task of maintaining an initial memory state c0 as long as possible instead of receiving additional inputs when ij is equal to zero in all time steps, may be taken into consideration.

For example, a cell state value cn of a standard LSTM including a nearly fully-opened forget gate with a gating function fj=1−∈ after the standard LSTM is updated "n" times may be represented as shown in Equation 12 below.

$$c_n=f_n\odot c_{n-1}=(1-\in)\odot(f_{n-1}\odot c_{n-2})=\ldots=(1-\in)^n\odot c_0 \quad (12)$$

Equation 12 indicates that a value (for example, a cell sate value) of a memory with ∈<1 decays exponentially with each time step.

Conversely, a PLSTM cell may decay only during an open period of a time gate. For example, when $k_t=0$ is satisfied for $t_{j-\Delta}\leq t\leq t_j$, the PLSTM cell may maintain a perfect memory value during a closed phase, for example, $c_j=c_{j-\Delta}$. Thus, during a single oscillation period of a length τ, the PLSTM cell may be updated during a duration of $r_{on}\cdot\tau$ that may result in substantially less than "n" update steps.

Due to the above cyclic memory, the PLSTM cell may have a longer and adjustable memory length via the parameter τ.

Oscillations may impose sparse updates of PLSTM cells, and thus it is possible to substantially reduce a total number of updates.

During training, the above sparsity of updates may ensure that a gradient is used for backpropagation through a smaller number of updates, to allow an undecayed gradient to be back-propagated through time and allow faster learning convergence.

Similarly to shielding of a cell state and a gradient of the cell state by an input gate and a forget gate of the standard LSTM, the time gate may prevent external inputs and time steps from dispersing and mixing the gradient of the cell state.

Because an output of a time gate may be dependent on an opening phase and the opening phase changes depending on a mod function, a derivative may be clarified. The mod function may be defined as mod $$(t,\tau)=t-\left\lfloor\frac{t}{\tau}\right\rfloor\tau,$$

and accordingly partial derivatives may be expressed using Equations 13 through 15 below.

$$\frac{\partial \mod(t, \tau)}{\partial t} = \frac{\partial t}{\partial t} - \tau \frac{\partial}{\partial t}\left(\left\lfloor \frac{t}{\tau} \right\rfloor\right) - \left\lfloor \frac{t}{\tau} \right\rfloor \frac{\partial}{\partial t}(\tau) = 1 - 0 - 0 \quad (13)$$

$$\frac{\partial \mod(t, \tau)}{\partial \tau} = \frac{\partial}{\partial \tau}t - \tau \frac{\partial}{\partial \tau}\left(\left\lfloor \frac{t}{\tau} \right\rfloor\right) - \left\lfloor \frac{t}{\tau} \right\rfloor \frac{\partial}{\partial \tau}(\tau) = 0 - 0 - \left\lfloor \frac{t}{\tau} \right\rfloor \quad (14)$$

$$\frac{\partial \mod(t, \tau)}{\partial t} = 1, \frac{\partial \mod(t, \tau)}{\partial \tau} = -\left\lfloor \frac{t}{\tau} \right\rfloor, \frac{t}{\tau} \notin \mathcal{Z} \quad (15)$$

A derivative of floor may be always zero because the mod function is flat everywhere except at points in which a step change is performed, and thus has an undefined derivative. A restriction $t/\tau \notin \mathcal{Z}$ may be disregarded.

The restriction $t/\tau \notin \mathcal{Z}$ may hardly occur in a floating-point, and minute jitter may resolve the above issue. However, a gradient with respect to a period may increase over time, and thus may not translationally invariant in time.

That is, in large datasets, final points may have a stronger influence on the period than the beginning, adding an offset in time or changing to a different timestamp may change a result. Depending on example embodiments, replacement with $\partial \mod(t,\tau)/\partial \tau := -1$ may be performed for a more consistent operation.

Figure 6A:
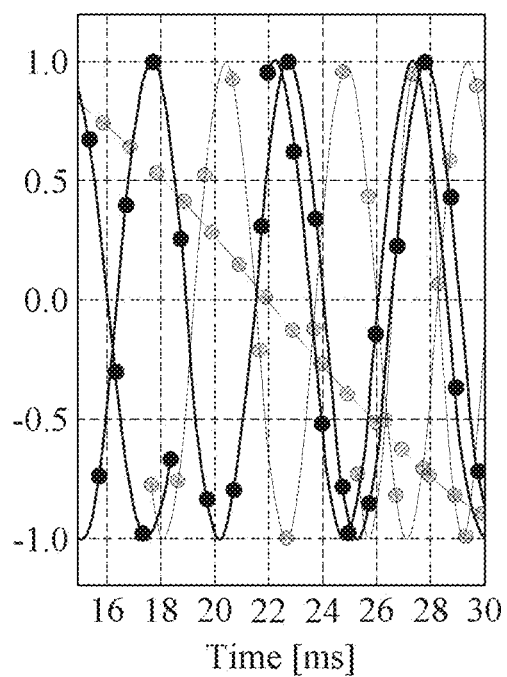
FIGS. 6A, 6B, 6C, and 6D are graphs illustrating examples in which input values of a PLSTM cell have different sampling rates, according to an example embodiment.
Figure 6B:
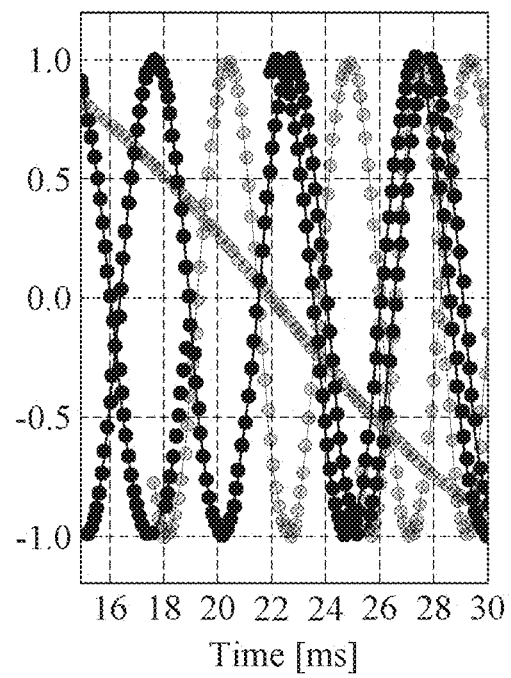
Figure 6C:
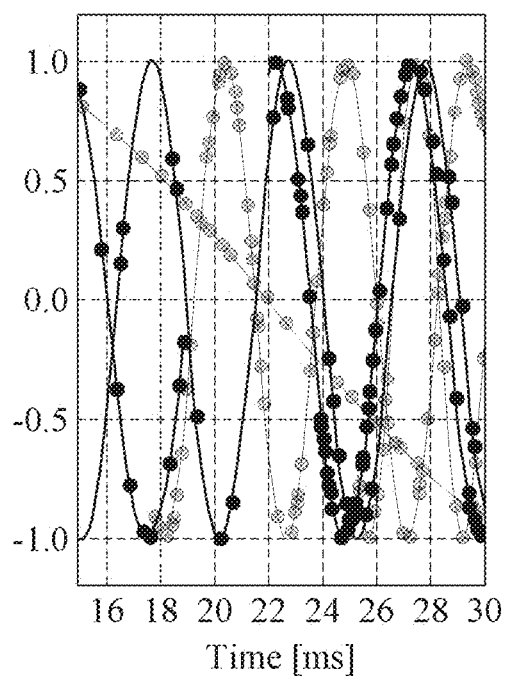
Figure 6D:
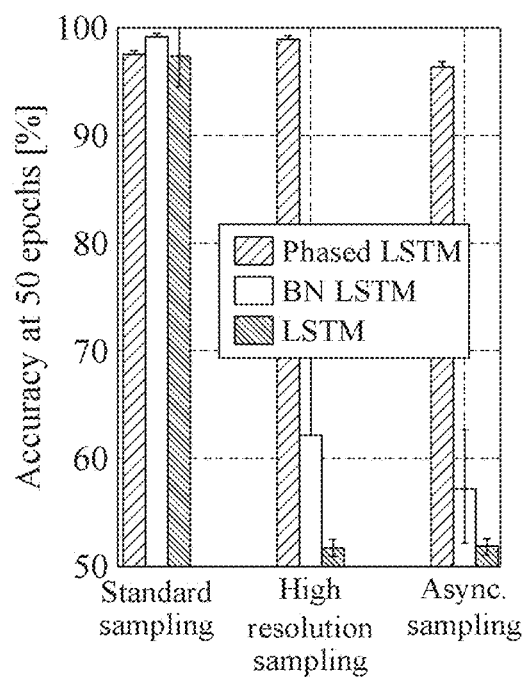

FIGS. 6A, 6B, 6C, and 6D are graphs illustrating examples in which input values of a PLSTM cell have different sampling rates, according to an example embodiment. FIG. 6A shows inputs of single-frequency sine waves that are regularly sampled, FIG. 6B shows inputs of sine waves that are sampled at a high resolution, and FIG. 6C shows inputs of sine waves that are irregularly sampled. Also, FIG. 6D shows results obtained by training a PLSTM cell, a batch-normalized (BN)-LSTM cell and a standard LSTM cell based on the sampled inputs.

The PLSTM cell may be trained for classification when a frequency of a sampled sine wave is within a desired frequency band. In FIGS. 6A, 6B, 6C, and 6D, an X-axis represents a sampling time in milliseconds (ms), and a Y-axis represents an amplitude.

The PLSTM cell may be trained by waveforms that are distinguished with different frequencies and that correspond to black points and gray points in FIGS. 6A, 6B, and 6C. The PLSTM cell may be trained to distinguish different frequency sets. All points in FIGS. 6A, 6B, and 6C represent input points.

FIG. 6A illustrates a standard condition in which data is regularly sampled at each time interval of 1 ms and input. In the standard condition, sine waves may be regularly sampled at each time interval of 1 ms.

FIG. 6B illustrates a high-resolution sampling condition in which new input points are gathered at each time interval of 0.1 ms. In the high-resolution sampling condition, that is, an oversampling condition, sine waves may be regularly sampled at each time interval of 0.1 ms, resulting in ten times as many data inputs.

FIG. 6C illustrates an asynchronous sampling condition in which new input points are presented at intervals of 0.02 ms to 10 ms. In the asynchronous sampling condition, samples may be collected at asynchronous times over a duration of inputs.

FIG. 6D illustrates results of training the PLSTM cell, the BN-LSTM cell and the standard LSTM cell under the above sampling conditions of FIGS. 6A, 6B, and 6C.

As shown in FIG. 6D, an accuracy of the PLSTM cell is maintained to be substantially the same under the sampling conditions of FIGS. 6A, 6B, and 6C, whereas an accuracy of each of the BN-LSTM cell and the standard LSTM cell decreases under the sampling conditions of FIGS. 6B and 6C. Error bars represent a standard deviation for five training runs.

Hereinafter, a PLSTM cell in a variety of scenarios that use either a precise update time or learning from a long sequence according to an example embodiment will be described.

For example, the PLSTM cell may be trained by a learning scheme set to default learning rate parameters. Unless otherwise specified, a leak rate a may be set to "0.001" during training, and may be set to zero during a test. A phase shift s for each neuron may be uniformly selected at an interval $[0, \tau]$.

An open ratio $r_{on}$ of "0.05" may be fixed and may remain unchanged during training. An oscillation period $\tau$ and a phase shift s may be learned during training.

The PLSTM cell may be trained to distinguish two classes of sine waves from different frequency sets, for example, frequency sets with a period in a target range T~U(5,6) and frequency sets outside the target range, that is, T~{U(1,5) ∪ U(6,100)}. U(a, b) denotes a uniform distribution on an interval (a, b).

The above task may show a benefit of the PLSTM cell because the task involves a periodic stimulus and uses a fine timing discrimination. Inputs may be denoted as pairs <y, t> in which y represents an amplitude and t represents a timestamp of a sample from an input sine wave. In FIG. 6A through 6D, darker curves may be separated from lighter curves based on samples represented as points.

Also, the sine waves may have a random phase shift uniformly drawn from all possible shifts, random numbers of samples drawn from U(10, 500), a random duration drawn from U(10, 50), and a start time drawn from U(0, 100−duration). The classes may be balanced, yielding a success rate of 50%.

Single-layer RNNs may be trained on data shown in FIG. 6A through 6D. Each of the RNNs may be repeated with five random initial seeds.

FIG. 6D shows a result obtained by comparing the PLSTM cell according to an example embodiment to an LSTM cell and a BN-LSTM cell found success in a predetermined application.

For the LSTM cell and BN-LSTM cell, a timestamp may be used as an additional input feature dimension. For the PLSTM cell, a time input (for example, a phase signal) may control a time gate.

For example, the LSTM cell and BN-LSTM cell may each include 2-110-2 neurons, and the PLSTM cell may include 1-110-2 neurons.

An oscillation period of the PLSTM cell may be uniformly drawn in an exponential space to provide a wide variety of applicable frequencies, for example, $\tau$~exp(U(0, 3)). Parameters other than the oscillation period may match between applicable models.

As shown in FIG. 6D, the LSTM cell, the BN-LSTM cell and the PLSTM cell are all excellent under the standard sampling condition. However, for the same number of epochs, an increase in data sampling by a factor of ten has devastating effects for the LSTM cell and the BN-LSTM cell and greatly reduces an accuracy of each of the LSTM cell and the BN-LSTM cell.

For example, when sufficiently training iterations are provided, the accuracy of each of the LSTM cell and the BN-LSTM cell may return to a normal baseline. However, for the oversampling condition, the accuracy of the PLSTM cell actually increases when an amount of information about an underlying waveform to be received increases.

The PLSTM cell may not be evenly updated and may have an excellent performance for asynchronously sampled data, because a time gate does not need to be regularly updated and may be correctly sampled at a continuous time within a period.

Figure 8:
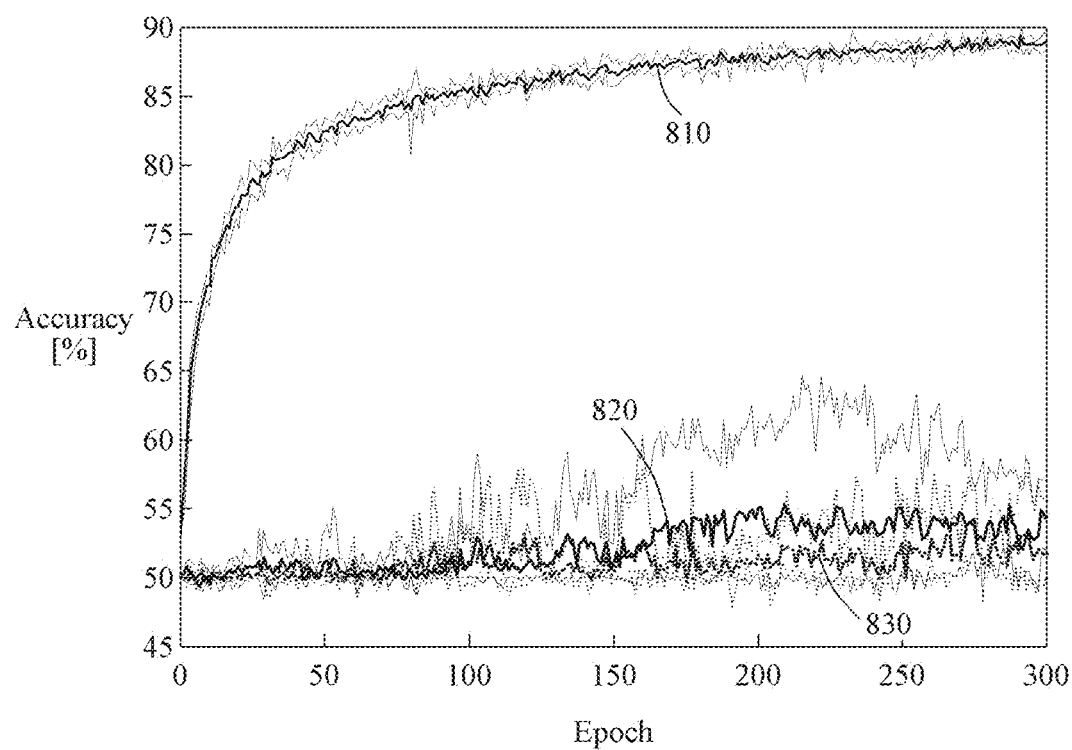
FIG. 8 is a graph illustrating an accuracy of each of a PLSTM cell, a batch-normalized (BN)-LSTM cell and an LSTM cell under asynchronous sampling conditions, according to an example embodiment.

How quickly the PLSTM cell converges to an exact solution in comparison to the standard LSTM cell, using exactly the same parameters will be analyzed based on a graph of FIG. 8.

Figure 7:
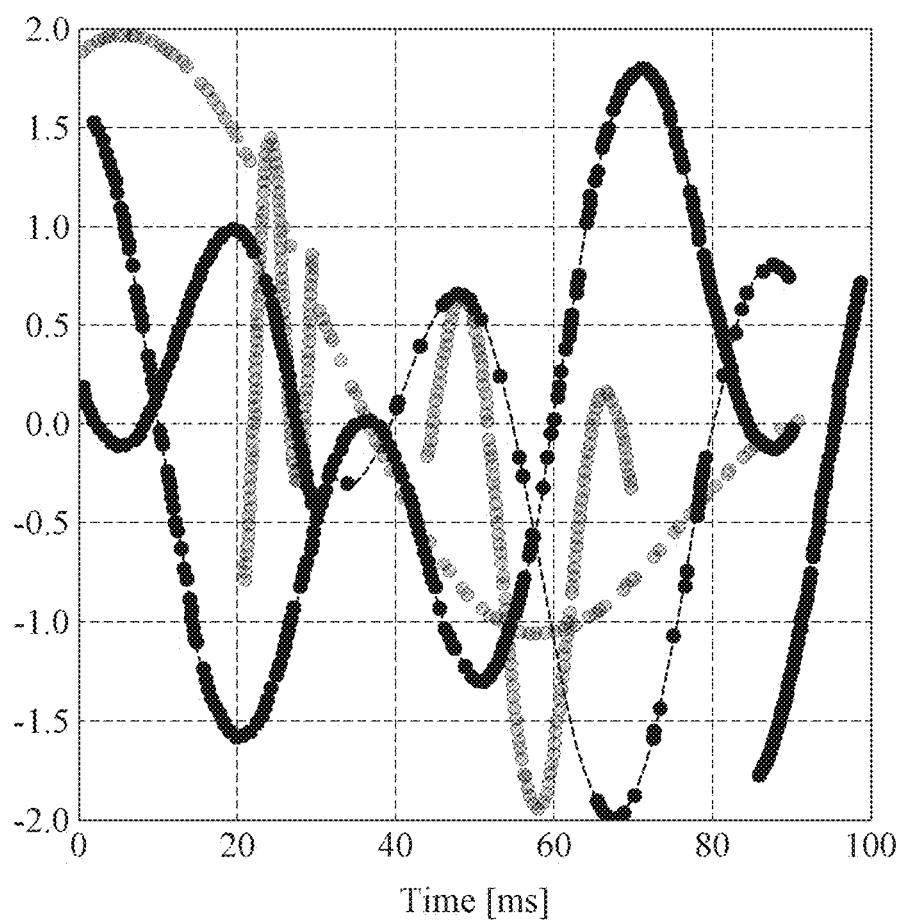
FIG. 7 is a graph illustrating an example in which two sine waves with different frequencies are mixed.

FIG. 7 is a graph illustrating an example in which two sine waves with different frequencies are mixed. In FIG. 7, a sine wave with a first frequency, and a sine wave with a second frequency are represented by a darker color and a lighter color, respectively.

When sine waves are mixed as shown in FIG. 7, a PLSTM cell according to an example embodiment may learn a scheme of distinguishing sine waves that overlap each other and that have different frequencies. The example of FIG. 7 is a task extended from the above task of FIG. 6A through 6D.

FIG. 8 is a graph illustrating an accuracy of each of a PLSTM cell, a BN-LSTM cell and an LSTM cell under asynchronous sampling conditions, according to an example embodiment. FIG. 8 illustrates an accuracy of each of a PLSTM cell 810, a BN-LSTM cell 820 and an LSTM cell 830 during training on a task of superimposed frequencies.

The graph of FIG. 8 shows that the PLSTM cell 810 is extremely quickly trained in comparison to the BN-LSTM cell 820 and the LSTM cell 830 and that the PLSTM cell 810 has a high performance while exhibiting a lower variance in comparison to the BN-LSTM cell 820 and the LSTM cell 830 during training.

In the graph of FIG. 8, dark lines indicate a mean of the accuracy of each of the PLSTM cell 810, the BN-LSTM cell 820 and the LSTM cell 830, and shading portions show a maximum value and a minimum value for five repetitions. The accuracy of the PLSTM cell 810 quickly increases to an optimal accuracy. The PLSTM cell 810 may operate similarly to a learnable, gated Fourier transform, and accordingly it is possible to easily separate out oscillations with different characteristic frequencies.

While a goal is to separate a pure frequency, real stimuli may involve at least one frequency. To extend the PLSTM cell 810 to real stimuli, the PLSTM cell 810 may be applied to a combination of a plurality of frequencies. Also, an RNN may be used to discriminate two classes of sine waves with different characteristics.

To investigate a scheme of helping learning using a time gate when a memory for a relatively long period of time is performed, an LSTM task called an "adding task" may be introduced.

In the LSTM task, a sequence of random numbers may be provided along with an indicator input stream. When "0" is included in the indicator input stream, a value presented in the sequence may be ignored. When "1" is included in the indicator input stream, the value presented in the sequence may be added. The PLSTM cell 810 may generate a sum of all indicated values.

In the LSTM task, an input value may not have an inherent periodicity. Using a longer period of time for a time gate may allow more effective training when the PLSTM cell 810 opens for a few time steps during training.

In the LSTM task, a sequence of numbers, for example, numbers of a length of 490 to 510, may be drawn from $U(-0.5, 0.5)$. Two numbers in a stream of numbers may be additionally marked. One among the two numbers may be from first 10% of the numbers (drawn with a uniform probability) and one may be in the last half (drawn with a uniform probability). The two numbers may generate a long and noisy stream of data with a few significant points.

The LSTM task may challenge the PLSTM cell 810 because there is no inherent periodicity and all time steps include marked points.

For example, when four sampling intervals, for example, $\exp(U(0,2))$, $\exp(U(2,4))$, $\exp(U(4,6))$ and $\exp(U(6,8))$, are compared, an oscillation period $\tau$ may be uniformly drawn in an exponential domain. Despite different oscillation periods, a total number of updates for each of the PLSTM cell 810, the BN-LSTM cell 820 and the LSTM cell 830 may remain approximately the same, because an overall sparsity is set by an open ratio $r_{on}$. However, a longer oscillation period may provide a longer jump through past time steps for a gradient during a backpropagation through time.

When a longer period of time is used, the PLSTM cell 810 may more efficiently learn longer sequences. The PLSTM cell 810 may accelerate training when a longer oscillation period is used to more quickly learn longer sequences.

Figure 9:
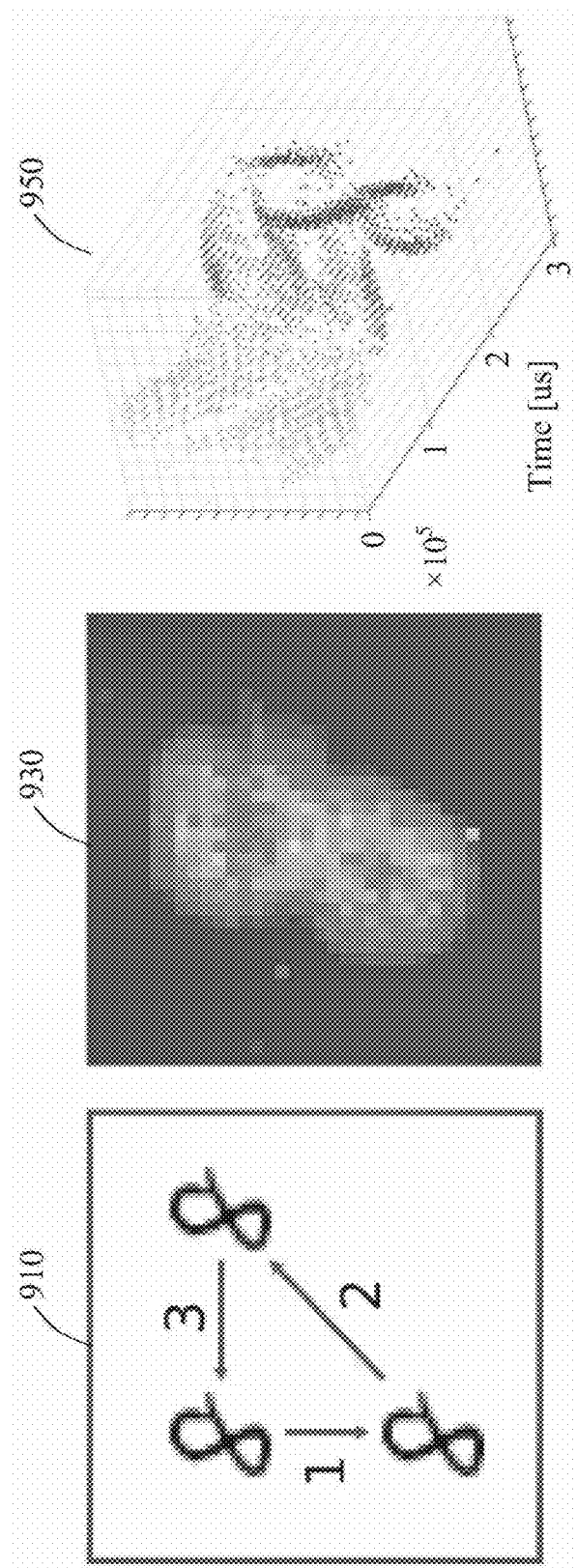
FIG. 9 is a diagram illustrating a result obtained by learning a dataset of a neuromorphic Mixed National Institute of Standards and Technology (N-MNIST) experiment based on an RNN, according to an example embodiment.

FIG. 9 is a diagram illustrating a result obtained by learning a dataset of a neuromorphic Mixed National Institute of Standards and Technology (N-MNIST) experiment based on an RNN, according to an example embodiment. The N-MNIST experiment may be used to identify digits.

FIG. 9 illustrates a sketch of a handwritten digit movement. A vision sensor may perform three saccades by moving down, moving diagonally and returning to an original position as shown in an image 910. An output of events that arrive from the vision sensor when a pixel increases or decreases in contrast may be logged.

An image 930 is a frame-based representation of "8" from an N-MNIST dataset obtained by integrating all input spikes for each pixel. When events are summed, a blurred representation that is difficult to learn may be generated as shown in the image 930.

An image 950 is a spatio-temporal representation of "8" represented in the three saccades of the image 910. The spatio-temporal representation may show "8" more clearly than a blurred frame-based representation.

Recording of FIG. 9 is acquired from an event-based vision sensor that is sensitive to local temporal contrast changes. An event may be generated from a pixel when a local contrast change exceeds a threshold. All events may be encoded as a 4-tuple <x, y, p, t> with a position (x, y) of a pixel, a polarity bit p indicating an increase or decrease in a contrast, and a timestamp t indicating a time at which an event is generated.

Recordings forming events may be generated by the vision sensor while the vision sensor performs three saccadic movements facing a static digit from the N-MNIST dataset of the image 910. An example of an event response (excluding a polarity) may be shown in the image 950.

In a previous task based on event-based input data, timing information may be removed occasionally, and instead a frame-based representation may be generated by computing a pixel-wise event-rate over a predetermined period of time as shown in the image 930.

A spatio-temporal surface of events in the image 950 may reveal details of a digit much clearer than in the blurred frame-based representation. A PLSTM cell may be used to directly operate spatio-temporal event streams.

TABLE 1

|  | CNN | BN-LSTM | Phased LSTM (T = 100 ms) |
|---|---|---|---|
| Accuracy at Epoch 1 | 73.81% ± 3.5 | 40.87% ± 13.3 | 90.32% ± 2.3 |
| Train/test ρ = 0.75 | 95.02% ± 0.3 | 96.93% ± 0.12 | 97.28% ± 0.1 |
| Test with ρ = 0.4 | 90.67% ± 0.3 | 94.79% ± 0.03 | 95.11% ± 0.2 |
| Test with ρ = 1.0 | 94.99% ± 0.3 | 96.55% ± 0.63 | 97.27% ± 0.1 |
| LSTM Updates | — | 3153 per neuron | 159 ± 2.8 per neuron |

Table 1 shows classification results of accuracy on an N-MNIST experiment for a convolutional neural network (CNN), a BN-LSTM and a PLSTM.

The CNN may be trained on frame-based representations of N-MNIST digits and two RNNs (for example, BN-LSTM cells and PLSTM cells that are trained directly on event streams). Because a result of an N-MNIST experiment for general LSTM cells is found to be worse, a general LSTM is not shown in Table 1.

The CNN may include three alternating layers of 8 kernels of 5×5 convolution with a leaky ReLU nonlinearity and 2×2 max-pooling. The three alternating layers may be fully connected to 256 neurons, and finally fully connected to 10 output classes.

An event address may be used to generate a 40-dimensional embedding via a learned embedding matrix, and may be combined with the polarity to generate an input.

A network architecture for the PLSTM cell may be, for example, 41-110-10. A network architecture for the BN-LSTM cell with a time given as an extra input dimension to the BN-LSTM cell may be, for example, 42-110-10. Table 1 shows that the PLSTM cell is trained faster than the CNN and the BN-LSTM cell and achieves much higher accuracy with a lower variance within a first epoch of training.

According to an example embodiment, a factor ρ that represents a probability that an event is included may be defined. For example, ρ of 1.0 may indicate that all events are included. RNN models may be trained with ρ of 0.75, and again the PLSTM cell may achieve slightly higher performance than the BN-LSTM cell.

When testing with ρ of 0.4 (fewer events) and ρ of 1.0 (more events) is performed instead of retraining, both the PLSTM cell and the BN-LSTM cell may greatly outperform the CNN for identifying digits.

This is because accumulated statistics of a frame-based input to the CNN change drastically when overall spike rates change. An RNN with the PLSTM cell may learn a stable spatio-temporal surface on an input and may be slightly changed by sampling the input more or less frequently.

Each neuron of the PLSTM cell may be updated about 5% of a time on average, which may lead to an approximate 20-fold reduction in a run time to calculate costs.

159 updates may be performed for neurons of the PLSTM cell in comparison to 3153 updates performed for neurons of the BN-LSTM cell.

Figure 10:
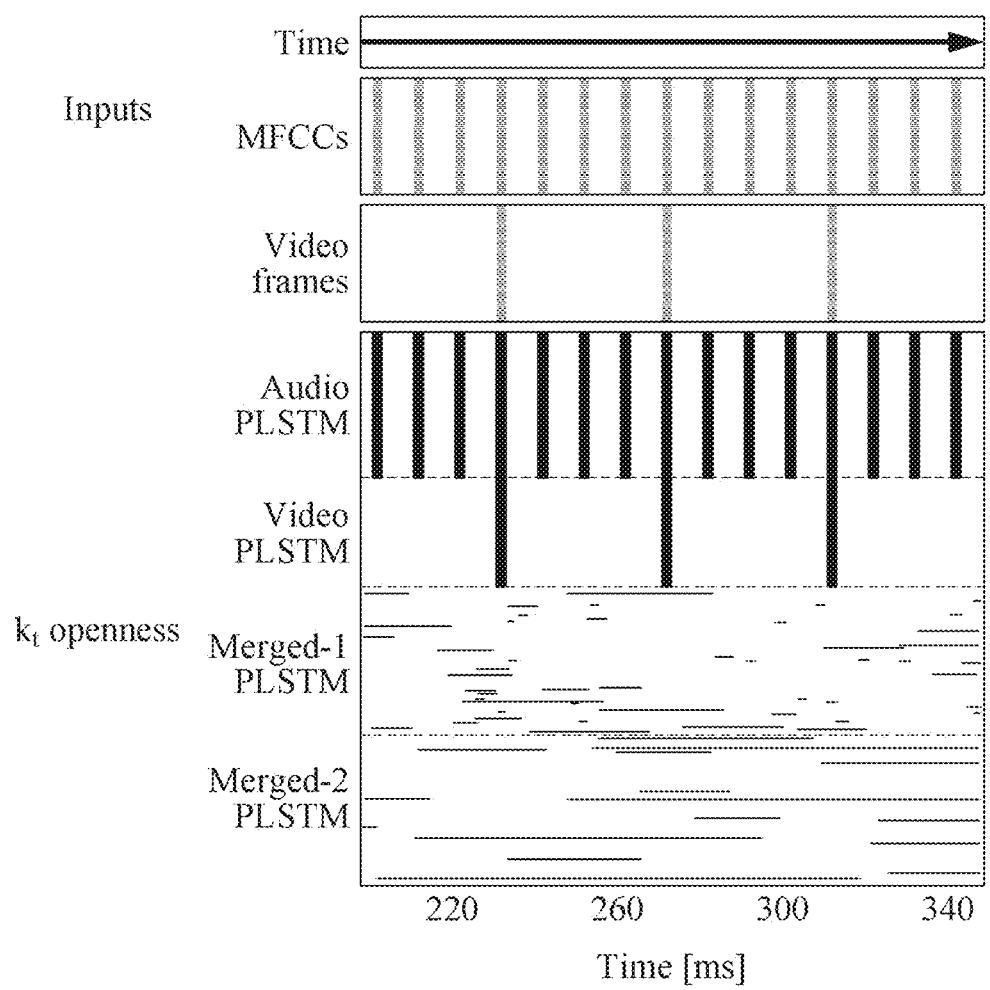
FIG. 10 is a diagram illustrating a method of fusing and processing a plurality of input values with different sampling rates in an RNN, according to an example embodiment.

FIG. 10 is a diagram illustrating a method of fusing and processing a plurality of input values with different sampling rates in an RNN, according to an example embodiment. FIG. 10 illustrates the plurality of input values and opening results of time gates for a lip reading experiment.

In FIG. 10, a video frame rate is 40 ms. A video frame rate of 25 frames per second (fps) corresponds to a plurality of audio input frequencies of 100 hertz (Hz). Timing parameters (for example, $\tau$, $r_{on}$ and s) of a PLSTM cell are aligned based on a sampling time of inputs of the timing parameters.

Mel-frequency cepstral coefficients (MFCCs) may be computed at each time interval of 40 ms with a network update.

A network architecture may separately process audio streams (MFCCs) and video frames (streams) before merging the audio frames and video frames in two RNN layers that receive two modalities.

An audio stream may connect 39-dimensional MFCCs (for example, 13 MFCCs with first and second derivatives) to 150 recurrent units.

A video stream may use three alternating layers including 16 kernels of 5×5 convolution and 2×2 subsampling to reduce an input of 1×48×48 to 16×2×2, which may be used as an input to 110 recurrent units.

For example, an open source computer vision (OpenCV) for implementing a face detector may be used for a video stream to extract a face that is resized to a grayscale of 48×48 pixels.

A goal is to obtain a model that may use audio alone, video alone, or both inputs (for example, audio and video) to robustly classify a sentence. However, because it is sufficient to achieve an accuracy greater than 99% by using the audio alone, sensor modalities may be randomly masked to zero during training to encourage robustness towards sensory noise and loss.

For example, inputs with different sampling rate, for example, audio having a high input sampling rate by a video input, may be fused using PLSTM cells.

Both streams may converge to a Merged-1 layer with 250 recurrent units, and may be connected to a second hidden layer with 250 recurrent units named "Merged-2." An output of a Merged-2 layer may be a fully-connected layer to 51 output nodes that represent a vocabulary of GRID.

In an RNN with a PLSTM network, all recurrent units may include PLSTM cells.

In an audio PLSTM layer and video PLSTM layer, open periods of time gates may be aligned to sampling times of inputs, and learning of parameters $\tau$ and s may be disabled. Thus, representing of zeros or artificial interpolations to a network may be prevented when data is not present.

In merged layers, parameters of a time gate may be learned with a period $\tau$ of a first merged layer drawn from U(10, 1000) and a second merged layer drawn from U(500, 3000).

An example in which a PLSTM cell is used to merge sensors with different timings will be described. A PLSTM cell that may use audio information, visual information or both may be trained to transcribe speech.

A GRID corpus may be used, a face region may be extracted, and audio may be converted to MFCCs. A corpus may include video and audio of 30 speakers each uttering 1,000 sentences with a fixed grammar and a constrained vocabulary of 51 words. Data may be randomly divided into a 90%/10% train-test set.

Audio is provided at each time interval of 10 ms, and video is provided at 25 fps or at each time interval of 40 ms. A neural network may provide zeros on other modalities when the audio and video are not aligned.

In the PLSTM cell, a time gate may be aligned with an arrival of new input data and natively may operate at an update frequency of a corresponding sensor. In a higher layer, slow time constants may be selected to allow a slow fusion and mixing between audio and video data streams.

FIG. 10 illustrates a timing relationship between input data (for example, MFCCs and video frames) and PLSTM cells.

In FIG. 10, audio (MFCCs) arrive at each time interval of 10 ms, while video frames arrive at each time interval of 40 ms.

Parameters of a gating function kt may be configured to align opening of a time gate with an arrival of data for an audio PLSTM layer and a video PLSTM layer. When the above two layers are separately processed, the two layers may be merged into a single RNN layer Merged-1 PLSTM with learnable and slow time constants, to provide mixing between sensory streams.

The RNN layer Merged-1 PLSTM may be abstracted with an even higher RNN layer Merged-2 PLSTM, before being classified. The RNN layer Merged-2 PLSTM intuitively shows sparsity of the PLSTM. The RNN layer Merged-2 PLSTM may be trained for a frequency discrimination task.

In FIG. 10, a black region corresponds to an open phase of neurons (for example, neurons included in a PLSTM) in which updating is performed similarly to a general LSTM, while a white region corresponds to a closed phase in which updating is not performed. Computation may not be required in the white region, and thus it is possible to reduce a large amount of computation.

According to an example embodiment, four modified LSTM models (for example, a joint PLSTM model, a random-dropout LSTM model, a cyclic LSTM model and a refractory LSTM model) that are formed based on the above-described LSTM cells and PLSTM cells may be used. By controlling the four modified LSTM models to operate under three conditions, for example, conditions A, B, and C, a factor from which a benefit of a PLSTM cell is derived may be analyzed. The four modified LSTM models may be referred to as "hybrid memory cell units."

Condition A involves whether benefits of a PLSTM arise from a longevity of a memory or a sparsity of an activation, which may be determined through a comparison with a random-dropout LSTM model with a sparsity of an activation. Also, the longevity of the memory is important.

Condition B involves whether alternative formulations of an open-close pattern are beneficial in models, for example, a cyclic LSTM model or a refractory LSTM model, that may be simpler than a PLSTM model.

Condition C involves whether potential deficiencies of the PLSTM model at meaningful short-term computation are capable of being addressed by a joint PLSTM model.

The four modified LSTM models, as well as an LSTM model and a BN LSTM model that are formed with LSTM cells, may be tested on a selection of evaluative tests including artificial tests, speaker identification, textual processing and neural-like data analysis.

According to an example embodiment, a joint PLSTM model may be a model that combines shorter-timescale modeling of an LSTM cell with long-contextual learning of the PLSTM model by forcing a subset of neurons of the PLSTM model including one or more PLSTM cells to be updated on every time step.

Joint PLSTM Model

A PLSTM model may provide a unique tradeoff between a computation within a time step and a memory over time. By extending an oscillation period τ and decreasing an open ratio $r_{on}$ in the PLSTM model, more neural states may represent older moments in an input history.

A PLSTM cell may be excellent in a long-term memory. However, for many tasks, for example, a natural language processing (NLP) task, a short-term time dependency may be as important as the long-term memory.

However, an extended off-period of neurons included in a PLSTM cell may leave the neurons unable to respond for long stretches to short-term fluctuations in an input, which may be greatly important. According to an example embodiment, using a joint PLSTM model, it is possible to solve a problem that neurons are incapable of responding for long stretches to short-term fluctuations in an input.

The joint PLSTM model may be a hybrid PLSTM model in which neurons, included in a PLSTM cell, which may be referred to as "PLSTM" neurons," are combined with neurons included in an LSTM cell, which may be referred to as "LSTM neurons." According to an example embodiment, the joint PLSTM model may include a majority of PLSTM cells and a predetermined percentage of LSTM cells.

For example, the joint PLSTM model may include hybrid memory cell units that each include a first type of memory cells and a second type of memory cells. The first type of memory cells may be configured to remember a first cell state value that is fed back to each of gates to determine a degree to which each of the gates is open or closed and may be configured to continue to update the first cell state value. The second type of memory cells may each include a first time gate configured to control a second cell state value of a second type of memory cell based on a phase signal of an oscillatory frequency, and a second time gate configured to control an output value of the second type of memory cell based on the phase signal, and may be configured to remember the second cell state value. For example, the first type of memory cells may correspond to an LSTM model, and the second type of memory cells may correspond to a PLSTM model.

In example embodiments, most PLSTM neurons included in the joint PLSTM model may be used to maintain long-term context, while a predetermined percentage of LSTM neurons may be used for a computation on shorter timescales and consistent update every time step.

The joint PLSTM model may be implemented by allowing a time gate $k_{i,t}$ included in the PLSTM cell to fully open for a predetermined percentage of LSTM neurons as shown in Equation 16 below.

$$k_{i,t} = \begin{cases} \tilde{k}_{i,t} & \text{if } i/n < \Theta \\ 1 & \text{otherwise} \end{cases} \quad (16)$$

In Equation 16, $\tilde{k}_{i,t}$ may be introduced to process an output of the time gate $k_{i,t}$. When a ratio i/n of neuron index i to a total number n of neurons included in the joint PLSTM model exceeds a predetermined ratio Θ of LSTM cells included in the joint PLSTM model, a final time gate $k_{i,t}$ for a neuron i at a time t may be set to "1" (fully open), and a predetermined percentage of neurons, for example, LSTM neurons, may be allowed to behave like LSTM neurons at all times.

The joint PLSTM model may have the same architecture as the architecture of the memory cell 200 of FIG. 2, and a time gate of FIG. 2 may be set to "1" at all times. Also, a cell state value based on opening and closing of time gates in the joint PLSTM model may continue to change when the $k_t$ openness of time gates for a portion of cells is "1" at all times.

Random-Dropout LSTM Model: Sparsity

A possible source of example benefits seen in the PLSTM model may be a sparse opening pattern of PLSTM neurons. The PLSTM neurons may be exposed to fewer time steps, which may allow a more powerful gradient to be preserved through training by decreasing a number of effective time steps to which the PLSTM neurons are exposed. However, whether the benefits of the PLSTM model arise from a sparsity or long-term memory may be unclear.

To determine which one of the sparsity and long-term memory is a dominant factor to the benefits of the PLSTM model, a neuron that has an identical wake-sleep sparsity may be designed, yet without a learnable periodicity to maintain the long-term memory, and may operate as shown in Equation 17.

$$k_{i,t} = \begin{cases} 1, & \text{if } p_i \sim \mathcal{U}(0,1) < \kappa \\ 0, & \text{otherwise} \end{cases} \tag{17}$$

In Equation 17, when a random variable $p_i$ drawn from a uniform distribution between "0" and "1" is less than a sparsity threshold $\kappa$, a time gate $k_{i,t}$ for a neuron i at a time t may be set to "1."

The random variable $p_i$ may be used to determine whether $k_{i,t}$ is to be set to "1" or "0." Also, u(0,1) denotes sampling of a value between "0" and "1" based on a uniform distribution, and a value obtained by the sampling of a value between "0" and "1" based on the uniform distribution may be $p_i$. For example, when the random variable $p_i$ that is randomly selected from "0" and "1" is less than the sparsity threshold $\kappa$, $k_t$ may be set to "1", and otherwise, may be set to "0."

Therefore, a mean occupancy $r_{on}$ of a time gate corresponding to a mean number of on-states may match a mean occupancy of the PLSTM model when an occupancy $r_{on}$ is equal to the sparsity threshold $\kappa$.

A random dropout may be one of methods to prevent overfitting in a neural network, and may refer to randomly setting a portion of nodes, for example, neurons, to "0" and dropping the nodes set to "0" out from a network. The nodes set to "0" may not operate. When the random dropout is used, the same "ensemble effect" as using of a plurality of networks, and a weight of each of neurons may be trained equally.

A success of the random-dropout (RndDrp) LSTM model in which open ratio $r_{on}$ matches the sparsity threshold $\kappa$ may imply that the sparsity is a driving factor in the benefits found for the PLSTM model. A poor performance of the random-dropout LSTM model may imply that a long-term memory of wake-sleep cycles has an importance.

Cyclic LSTM Model: Periodic Long-Term Memory

Similarly, when an individual periodicity of opening periods of the PLSTM model is a primary factor of the benefits of the PLSTM model, using of a single parameter to represent a period of a PLSTM neuron may suffice to create a periodic oscillation.

Each of PLSTM neurons may have a fixed phase relationship to the other neurons, and a single time step of opening may allow a single parameter, for example, an oscillation period $\tau$. The oscillation period $\tau$ may be used with respect to the time gate $k_{i,t}$ for a neuron i at a time t, as shown in Equation 18.

$$k_{i,t} = \begin{cases} 1, & \text{if round}(t \bmod \tau_i) = 0 \\ \alpha |\phi_{i,t} - 0.5|, & \text{otherwise} \end{cases} \tag{18}$$

In Equation 18, an off-period may be centered at half the open phase, $\phi_{i,t}$–0.5, in order to direct a gradient towards a first time step, and an off leak a may allow a propagation of gradient information during an off phase.

For example, when the cyclic LSTM model succeeds, an evidence that an example primary benefit of the PLSTM model lies in the long-memory and periodicity may be provided. When a performance of the cyclic LSTM model does not nearly match a performance of the PLSTM model, parameters that encode a relationship between neurons, a phase shift and an on duration ratio, that is, an open ratio, may need to learn useful re-alignments of neuron activation patterns. An oscillation period $r_1$ for a neuron i may be trainable in Equation 18.

Refractory LSTM Model: Non-Periodic Long-Term Memory

As another possibility, a phase relationship and periodicity may be unnecessary and only a long-term memory of PLSTM neurons may be required.

The above possibility may be tested by introducing a refractory end time $r_{i,t}$ at which a state of a neuron changes from an off state or a refractory state to an on state. A period of the refractory end time may be set by Equation 19 shown below. The refractory state may be referred to as a "non-response state" indicating there is no response.

$$k_{i,t} = \begin{cases} 1, & \text{if } t > r_{i,t} \\ 0, & \text{otherwise} \end{cases}, \tag{19}$$

$$\tau_{i,t+1} = \begin{cases} t + \tau_i, & \text{if } t > r_{i,t} \\ r_{i,t} & \text{otherwise} \end{cases}$$

In Equation 19, the time gate $k_{i,t}$ may be open immediately after a current time t exceeds the refractory end time $r_{i,t}$ for the neuron i. When the time gate $k_{i,t}$ is set to "1" due to opening of the time gate $k_{i,t}$, a neuron may be updated as a standard LSTM cell. When the neuron is updated, the time gate $k_{i,t}$ may re-enter the refractory state in which the time gate $k_{i,t}$ remains fixed until reopening after the refractory period.

The refractory LSTM model may ensure that past memories are maintained and not overwritten, and may eliminate all dependencies between neurons. Waiting for a sufficiently long period of time before delivering an input to the refractory LSTM model may bring all neurons out of the off-phase, that is, an off state, while immediately providing all inputs may place all neurons into a refractory phase, that is, the refractory state. When the refractory LSTM model succeeds, a predominant factor in a success of the PLSTM model may be an enhanced distant memory of events, which may maximize the refractory LSTM.

Hereinafter, exemplary embodiments relating to a series of experiments designed to stress different components of example LSTM models on a variety of artificial and real-world benchmarks, and results of the experiments will be described. A comparison between neuron model types may include a measurement that incorporates a variety of effects as shown in FIG. 11.

Figure 11:
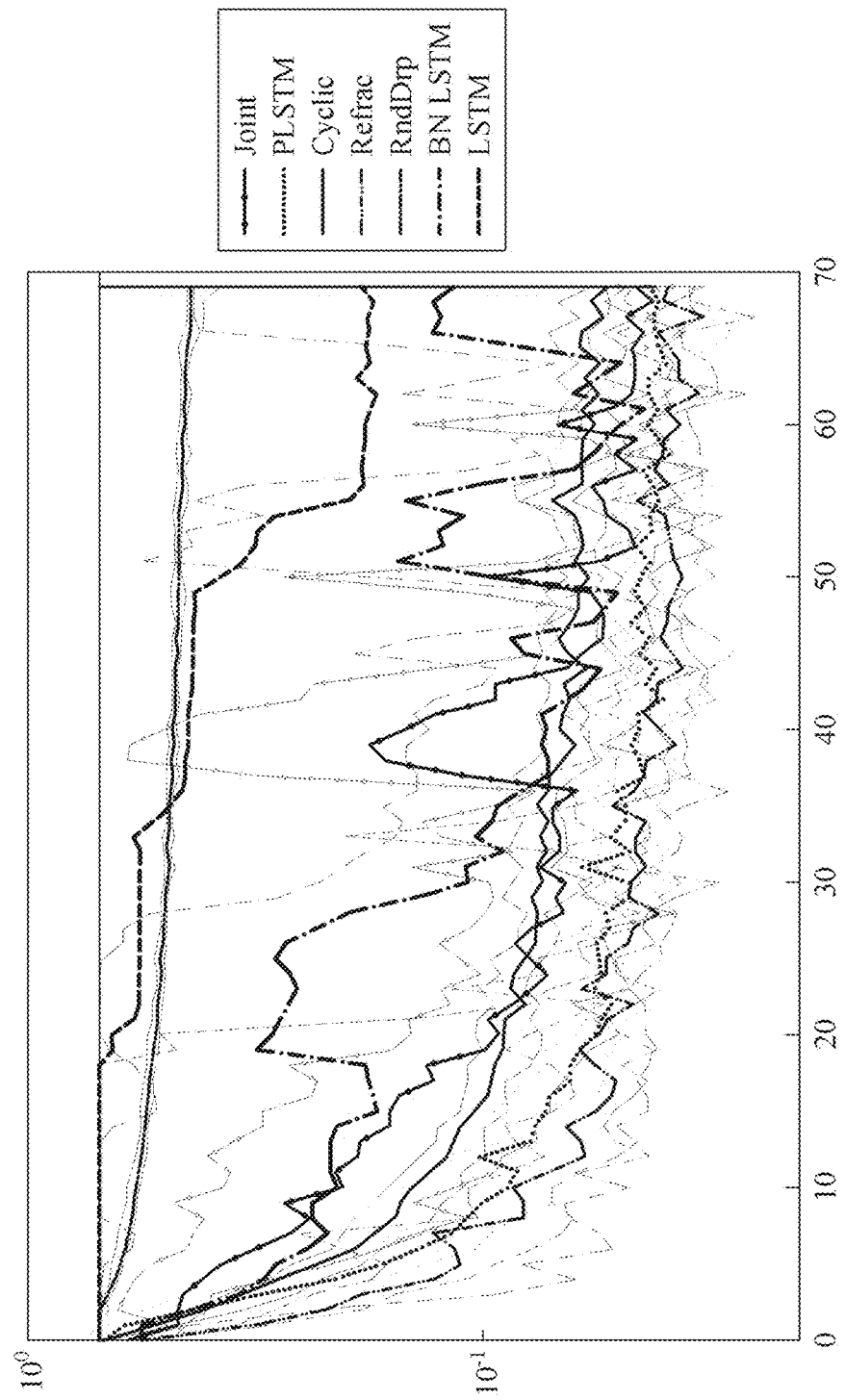
FIG. 11 is a graph illustrating an error occurring during a frequency discrimination task of LSTM models according to an example embodiment.

FIG. 11 is a graph illustrating an error occurring during a frequency discrimination task of LSTM models according to an example embodiment. In FIG. 11, shading indicates a minimum value and a maximum value of the error, and a standard sampling condition.

Figure 12A:
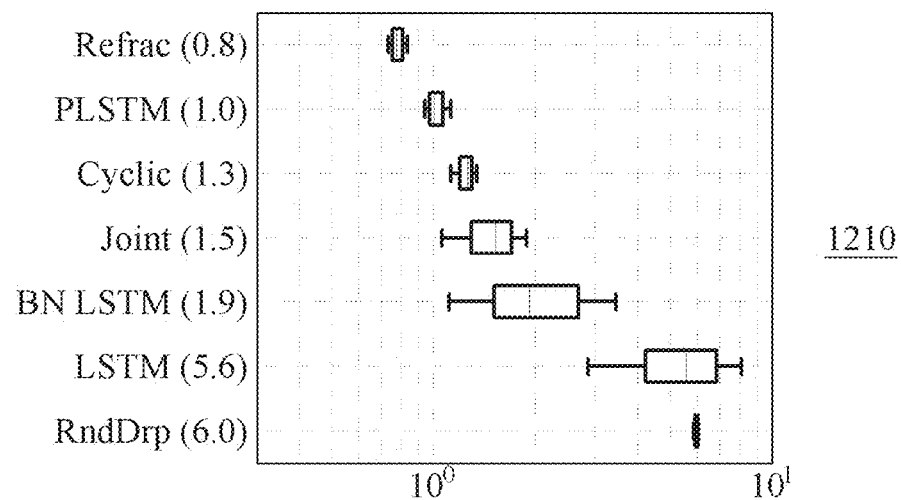
FIGS. 12A, 12B, and 12C illustrate results of an integral of error during a frequency discrimination task between LSTM models according to an example embodiment.
Figure 12B:
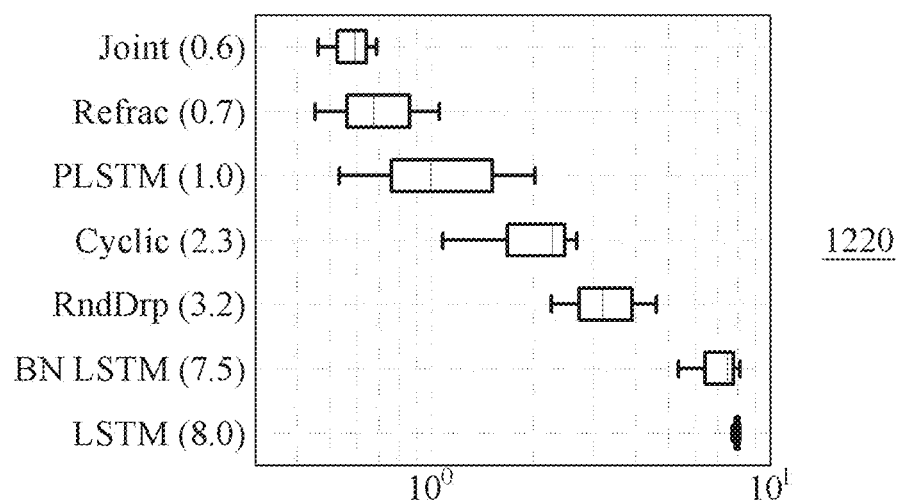
Figure 12C:
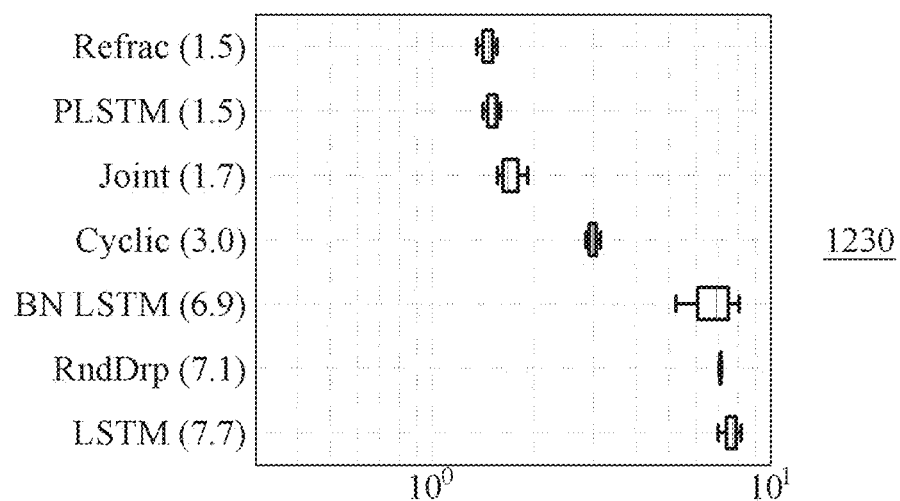

FIGS. 12A, 12B, and 12C illustrate results of an integral of error during a frequency discrimination task between LSTM models according to an example embodiment. Referring to FIGS. 12A, 12B, and 12C, box plots are used to depict the results of integral of error between the LSTM models in different sampling conditions. A box plot may be a method of graphically depicting groups of numerical data through quartiles. Also, the box plot may have a line extending vertically from a box, with a whisker, indicating a variability outside upper and lower quartiles.

In FIGS. 12A-12C, the box plots indicate a mean with a vertical line, and indicate a minimum value and maximum value with whisker lines. Also, a box may extend to lower and upper quartiles of normalized results.

In FIG. 12A, a graph 1210 illustrates a result of an integral of error between the LSTM models under a standard sampling condition according to an example embodiment, and in FIG. 12B, a graph 1220 illustrates a result of an integral of error between the LSTM models under a high-resolution sampling condition according to an example embodiment. Also, in FIG. 12C, a graph 1230 illustrates a result of an integral of error between the LSTM models under an asynchronous sampling condition according to an example embodiment.

The results of FIGS. 12A, 12B, and 12C may correspond to a standard sampling task of the LSTM models according to an example embodiment, and may be obtained when the standard sampling task is performed five times for each of LSTM models. In the standard sampling condition of the graph 1210, data may be regularly sampled at each time interval of 1 ms. In the high-resolution sampling condition of the graph 1220, new input points may be gathered at each time interval of 0.1 ms. In the asynchronous sampling condition of the graph 1230, new input points may be presented at intervals of 0.02 ms to 10 ms.

A portion of LSTM models may quickly converge and drop back to chance, to converge again. The other LSTM models may exhibit a very tight variance but a high error. Other models may have errors that vary across orders of a magnitude. All of the above operations may be captured by a single performance metric that encapsulates a function of a model to speedily decrease an overall error, to remain converged and to reach an overall low final loss.

An integral of error IOE may be used as a primary error measure, and may be expressed by Equation 20.

$$IOE = \sum_{n=1}^{N} \mathcal{L}(x, y) \quad (20)$$

In Equation 20, the integral of error IOE is a sum of all losses L for mini-batches indexed by n from "1" through "N," composed of inputs x and targets y.

The mini-batches may be a method of training a network of LSTM models by using, as training data, a small number of subsets into which an entire data set is slightly divided.

Unlike using final performance accuracy as a criteria, the integral of error may penalize slow-converging models or models that unstably reach minima. Unlike a time-to-convergence measure that records a number of epochs required to arrive at a satisfactory performance level, the integral of error may always be defined and calculated, regardless of whether the model has converged.

Because the integral of error has arbitrary scaling and varies depending on a run length, the integral of error may be used merely for a comparison between LSTM models. Furthermore, the resulting integral of error may be multiplicatively normalized to yield useful comparisons against a reference run, for example, a PLSTM model.

Frequency Discrimination Task

An initial experiment for the above-described LSTM models may be revisited, because a frequency discrimination task may separate effects of a sampling method and a data length.

As described above with reference to FIG. 9, a series of points <y, t> may be provided to the PLSTM model arising from a sine wave of an unknown period and phase shift, and the PLSTM model may determine whether the points correspond to a sine wave with a period from a predetermined range. Classes may be balanced, to yield a chance rate of 50%.

The LSTM models may be tested under the following three conditions.

A first condition, for example, the graph 1210 of FIG. 12A, that corresponds to a dominant method in which an RNN is currently used, may provide on average "70" data points at regularly-spaced time step intervals. All LSTM models may succeed at the frequency discrimination task, and an error may be primarily determined by how quickly an LSTM model is capable of converging to a lower error.

In a second condition, for example, the graph 1220 of FIG. 12B, a sampling rate may be increased by a factor of ten, which may lead to input sequences an order of magnitude longer. A test based on the second condition may particularly probe a function of a PLSTM model to quickly learn long sequences.

In a third condition, for example, the graph 1230 of FIG. 12C, LSTM models may receive the same number of input points as in the first condition, however, instead may be sampled asynchronously. Data may be normalized so that an error of a standard sampling condition of an LSTM model may be "1," which may facilitate comparisons between the LSTM models. For example, the graph 1230 shows that asynchronous sampling for an LSTM model increases the integral of error by 50% in comparison to an LSTM model having evenly-stepped time steps. In general, the above results may lay out a conclusion that will be echoed in a subsequent experiment.

A joint PLSTM model with both a long-term memory of a PLSTM cell and a short-term memory of an LSTM cell may be excellent in performance and may be superior according to circumstances.

Combination of Longer-Term Memory and Shorter-Term Memory

A joint LSTM model including both a PLSTM cell for a longer-term memory and an LSTM cell for a shorter-term memory may actually exhibit an excellent performance. For a very long input sequence of a fast sampling rate in the graph 1220, a performance of the joint PLSTM model may exceed a performance of the PLSTM model and the joint PLSTM model may actually converge faster for a long sequence than for a short sequence, which may imply a better sample complexity than the other models.

Sparsity Vs. Long-Term Memory

Through the random-dropout LSTM model, the cyclic LSTM model and the refractory LSTM model that are described above, whether benefits of the PLSTM model arise from the sparsity or from the long-term memory may be investigated.

The random-dropout LSTM model that matches the sparsity of the PLSTM model consistently exhibits a worst performance for each input type. The cyclic LSTM model and the refractory LSTM model that are designed to test whether a periodicity and the resulting long-term memory may be important, and often exhibit superior performances for each category. Thus, the long-term memory may be implied as a dominant factor that leads to the best performance of the PLSTM model, when both the sparsity and the long-term memory are taken into consideration.

Periodicity Vs. Non-Periodicity

In addition to storing of timing parameters, the cyclic LSTM model and the refractory LSTM model may be used to investigate a function of learning periodic decompositions of an input versus having long-term memories. A periodic cyclic LSTM model may not perform as well as the refractory LSTM model, because a plurality of subsequent inputs may both resolve to round (t mod τi)=0 and overwrite previous values, which may suggest that extra parameters may confuse the PLSTM model.

Figure 13:
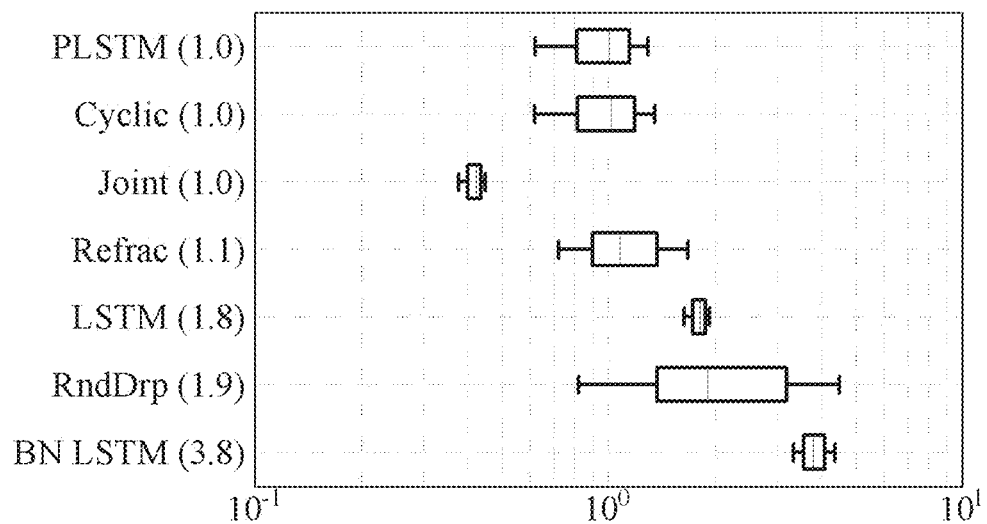
FIG. 13 is a graph illustrating a measurement result of an integral of error occurring during a real-world speaker identification task in PLSTM models according to an example embodiment.

FIG. 13 is a graph illustrating a measurement result of an integral of error occurring during a real-world speaker identification task in PLSTM models according to an example embodiment. FIG. 13 illustrates a result obtained by measuring the integral of error when a speaker identification task is performed using a MOCHA-TIMIT dataset.

Beyond artificial data, the MOCHA-TIMIT dataset may be used for the real-world speaker identification task. For example, in the MOCHA-TIMIT dataset, three speakers, for example, two males and one female, may be recorded speaking 460 sentences, and 90% of the 460 sentences may be used for training and 10% may be used for a test.

In this example, each of the 460 sentences may be transformed into 23 filter bank features, padded per batch to match in a length, and used as an input to a neural network of 110 recurrent neurons of a given PLSTM model type. Also, each of the 460 sentences may be connected to a fully-connected layer of 3 softmax output neurons that represent a probability of each target class.

For a PLSTM model that requires a time input, an input step index ranging t∈(0, L) for a sequence of a length L may be used. To obtain the result of FIG. 13, five independent seeds may be used.

The MOCHA-TIMIT dataset may be used as an example of a real-world test without an inherent periodic nature in which sequences are moderately long (averaging around 390 time steps). Most PLSTM models may achieve a perfect performance until training ends.

Referring to FIG. 13, in a synchronous and real-world example, most modified LSTM models other than a sparsity-matching random-dropout LSTM model may perform equally well. The modified LSTM models (for example, a PLSTM model, a joint PLSTM model, a cyclic LSTM model and a refractory LSTM model) may exhibit similar integral of errors.

The modified LSTM models may have a superior performance to the standard LSTM model and the BN LSTM model, despite standard synchronous samples of a dataset that needs to favor a standard model.

Figure 14A:
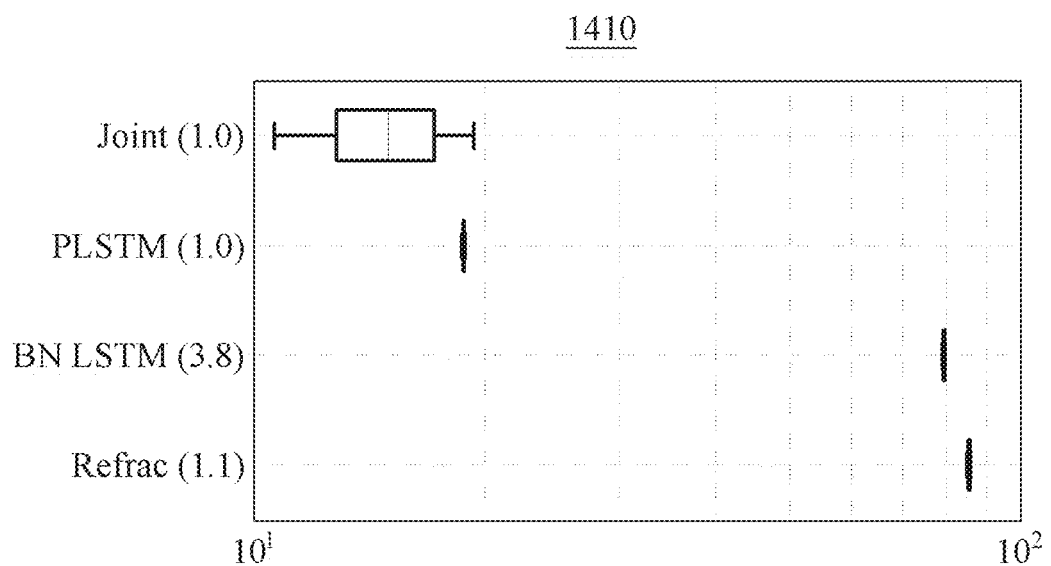
FIGS. 14A and 14B illustrate a measurement result of an integral of error during a natural language processing (NLP) task in PLSTM models and a validation error according to an example embodiment.
Figure 14B:
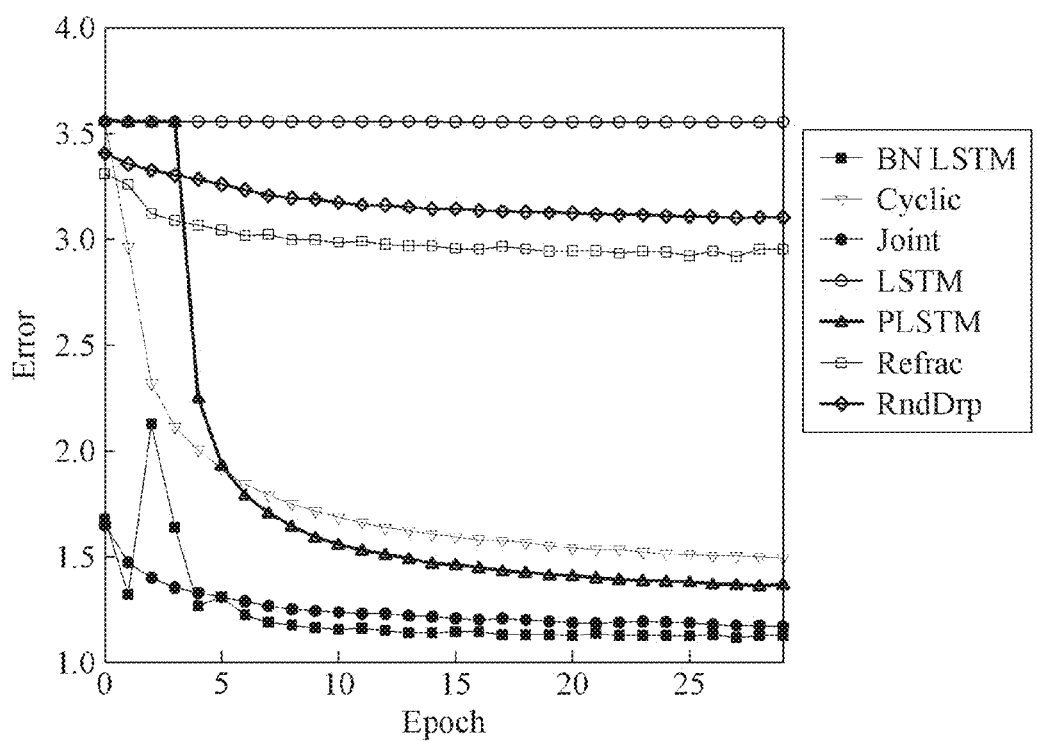

FIGS. 14A and 14B illustrate a measurement result of an integral of error during an NLP task in PLSTM models and a validation error according to an example embodiment.

In FIG. 14A, a graph 1410 shows a result obtained by measuring an integral of error when the NLP task is performed using a TI-DIGITS dataset. Also, in FIG. 14B, a graph 1420 shows a validation error on an enwiki8 100 MB Wikipedia dump. In the graph 1420, due to a long computation time, for example, approximately 1 hour/epoch on a GTX 980Ti, only a result of a single run of each PLSTM model is shown as a qualitative comparison result.

The NLP task may be one of areas that may be very challenging for a PLSTM model. A long-term memory of the PLSTM model may be a great aid in processing long documents or interpreting documents processed at a fine resolution, for example, a character. However, a success of n-grams may indicate important short-term context as well.

A PLSTM model may suffer under short-term context, as many fewer of neurons are reliably available every time step, and training may not seem to yield solutions in which the neurons are consistently on 100% of the time.

In example embodiments, a joint PLSTM model may be perfect for merging a shorter-term memory of the LSTM model with a longer, trainable longer-term memory of the PLSTM model, and thus a high performance may be expected on an NLP task of the joint PLSTM model.

As a difficult long-context NLP task, an enwiki8 Hutter 100 MB Wikipedia encoding example may be used. The above task may include creating a model that predicts a next byte in a Wikipedia dataset and measuring a mean log-probability of the dataset. A goal of the task may be to compare an LSTM model and PLSTM models.

For example, a neural network may include a 30-dimensional embedding layer, three layers of 400 units, and a dense layer that is connected to a softmax of 256 possible choices for an output byte.

For PLSTM models that require a time input, an input step index ranging t∈(0, L) for a sequence of a length L may be used, and results may be found in the graph 1420.

Many of the above-described trends, such as lower performances of the LSTM model and the random-dropout LSTM model shown in the graph 1420, may be again borne out. The BN LSTM model may perform the task after an initial period of instability. As expected, the joint PLSTM model may outperform all other LSTM models.

When considering that only approximately 1/20th of the neurons are being used per time step (with $r_{on}$=0.05) in comparison to a standard recurrent model, high performances of all LSTM (*PLSTM models may be surprising, which may indicate that a substantial redundancy exists in the standard recurrent model and that dramatically scaling up of a number of neurons (for example, by 20-fold) in periodic models may yield great performance improvements on NLP tasks. Also, an NLP result of an LSTM portion of the joint LSTM model may be similarly improved by applying a batch normalization to inputs of the LSTM portion.

The TI-DIGITS dataset may be TI-DIGITS cochlea data, and may include 2,464 training recordings and 2,486 test recordings of spoken digits presented to a biologically-inspired silicon cochlea.

In particular, the above hardware implementation may replicate a tonotopy that emerges from spatial filtering of a basilar membrane in a cochlea through a 64-stage cascaded second-order filter bank, spanning 100 Hz to 20 kHz on a log frequency scale, followed by a half-wave rectifier that models inner hair cells, driving an integrate-and-fire neuron that models spiral ganglion cells.

As described above, The TI-DIGITS dataset may be an excellent and repeatable platform for prototyping algorithms for neural data, because an output is a collection of neuron-tagged binary events, each generated in continuous time. A sequence of neural data may be a pair of <a, t> in which a encodes a neuron address and a timestamp t with a microsecond resolution, and in which the sequence ranges between 2,000 events and 7,000 events and is rather longer than typical recurrent inputs.

A natural affinity of the PLSTM model to continuous-time, long-sequence data may confer a benefit maintained by the joint PLSTM model. The above results may suggest that fine timing of continuous-time events confer a benefit, and that the above kind of neural data may prove a good match for PLSTM models.

Figure 15A:
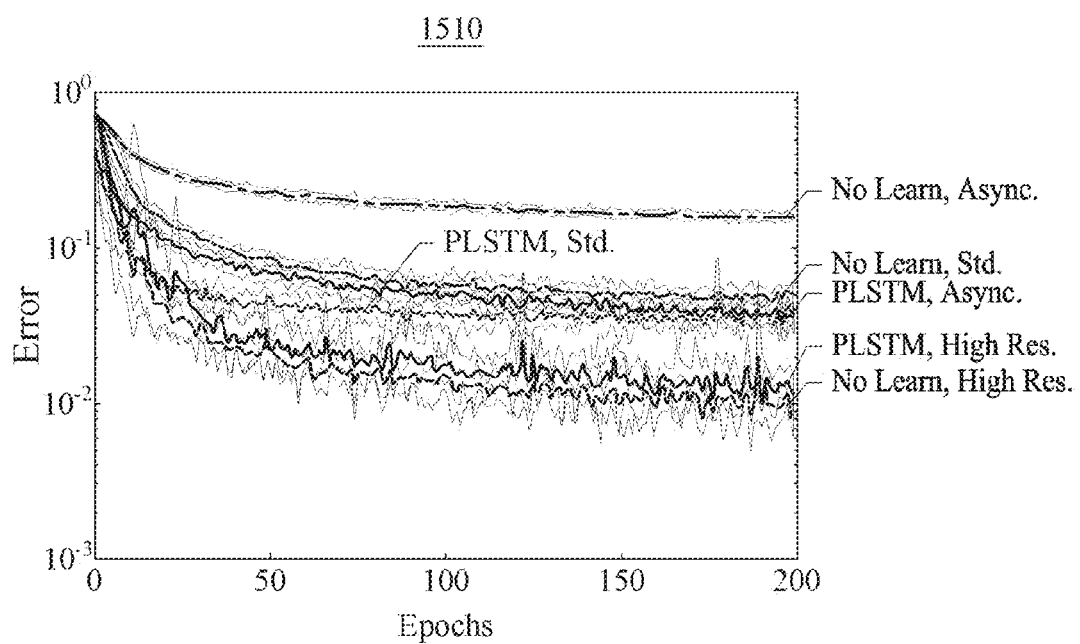
FIGS. 15A and 15B illustrate task results in an example of changing timing parameters in PLSTM models according to an example embodiment.
Figure 15B:
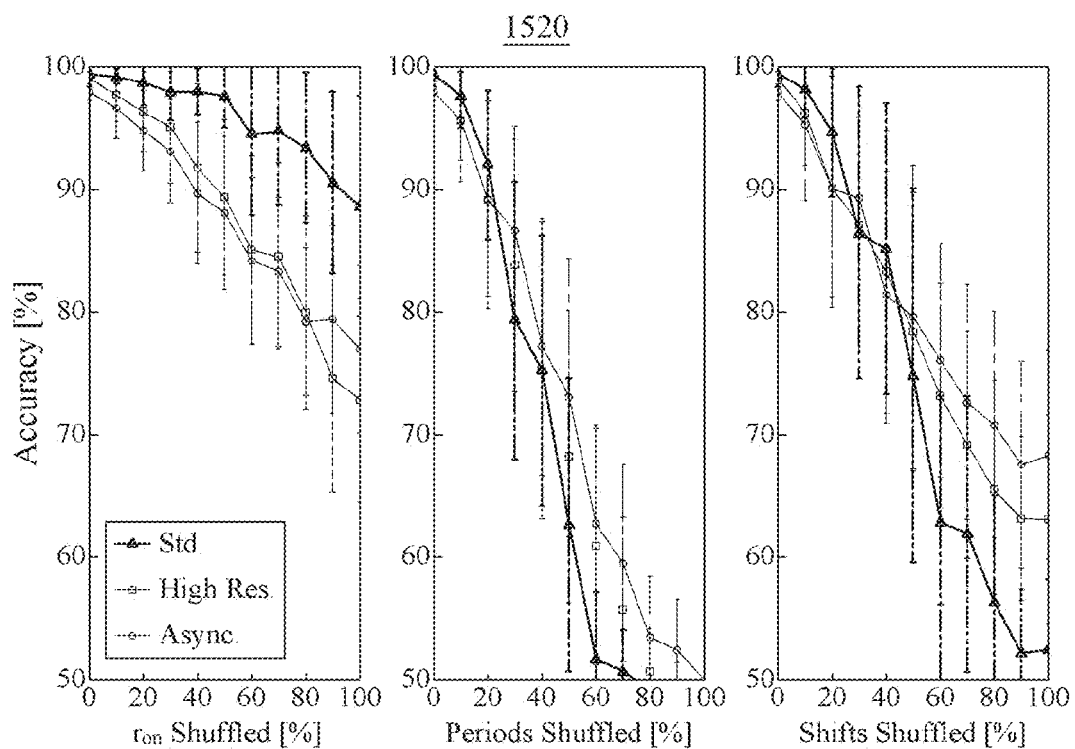

FIGS. 15A and 15B illustrate task results in an example of changing timing parameters in PLSTM models according to an example embodiment. A graph 1510 of FIG. 15A illustrates results that are obtained by learning timing parameters under three conditions of a frequency task, with a minimum value and maximum value shown in shading and that are indicated by solid lines, and results that are obtained when no learning is performed and that are indicated by dashed lines. It may be found through the graph 1510 that the learning of the timing parameters is helpful. In the following description, the terms "learning" and "training" may be interchangeably used with respect to each other.

An effect of learning timing parameters, for example, $r_{on}$, $\tau$ and s, may be analyzed through denying learning or systematically corrupting the timing parameters after training.

One benefit of a PLSTM model may be the learned timing parameters that sparse implementations lacked. The result of disabling training during the frequency task may be found in the graph 1510. In the graph 1510, the solid lines correspond to normal training conditions, while the dashed lines correspond to learning with training disabled.

For rapid sampling, little difference may exist. However, in the graph 1510, both a convergence and final error are substantially improved for a standard sampling condition that is represented by PLSTM Std. indicated by a solid line and No Learn, Std. indicated by a dash-double dotted line, and an asynchronous sampling condition that is represented by PLSTM Async. indicated by a solid line and No Learn, Async. indicated by a dash-single dotted line. Also, training of parameters of a PLSTM model may important to yield good results for at least predetermined tasks.

A graph 1520 of FIG. 15B shows results of ablation of parameters, for example, $r_{on}$, $\tau$ and s, for three frequency task conditions. In the graph 1520, error bars are standard deviations calculated through ten random shufflings.

A relative importance for each parameter type may be investigated by selectively corrupting the parameters of the PLSTM model. A parameter ablation process may include loading a trained PLSTM model, randomly selecting a predetermined percentage of LSTM neurons and permuting parameters of a selected group to within a group, to corrupt corresponding values. A random percentage may be swept from 0% to 100%, which may be repeated for each model with five different initializations. Results of the parameter ablation process may be found in the graph 1520.

Because curves differ depending on a task in the graph 1520, parameters may be used to change extents in different tasks. Randomly permuting of periods, that is, the parameter $\tau$ may have a greatest influence on an accuracy of a system, where even at 50% corrupted neurons most models lie at chance.

The parameter s may be a next most sensitive parameter and exhibit greater task-dependent results. The parameter $r_{on}$ may be substantially less important.

In an example, values of the parameters, for example, $r_{on}$, $\tau$ and s, may be randomly shuffled and a change in a performance may be observed. In this example, the values of the parameters may be set for each neuron through training.

In another example, a degree by which a performance decreases may be observed, when trained parameter values are randomly exchanged and shuffled between neurons, that is, when a training effect for each neuron is removed. In this example, the exchanging of the trained parameter values between the neurons may differ from replacing the trained parameter values with completely random values. For example, when all neurons have similar values of $r_{on}$ after training, a performance may remain unchanged even though the values of $r_{on}$ are randomly shuffled.

The above methodology may reinforce previous findings with the cyclic LSTM model and refractory LSTM model in which a learnable open period (*open ratio $r_{on}$ is not important in comparison to the above models.

For many application fields and with an inspiration from biology, combining of a shorter-term memory and longer-term memory may be advantageous in order to extract temporal patterns across a wide range of temporal scales. Currently, even with benefits offered by gating in LSTMs and gated recurrent units (GRUs), training for long sequences may not converge rapidly. Conversely, a PLSTM model that trades off per-time step computation in favor of longer memories may be optimized for longer-term memories and may suffer due to significant short-time step interactions.

Thus, it is possible to obtain a higher performance across a wide variety of tasks using a joint PLSTM model that combines a PLSTM model and LSTM model.

A failure of the refractory LSTM model on complex tasks may suggest that periodic decompositions may be a powerful tool for real-world data. Despite an intuitive sense for a predetermined task such as audio processing, the same principle may be applied equally to a variety of problems including a textual analysis and spike analysis. Also, the above joint PLSTMs may be used throughout a hierarchy, and may perform intermediate neuron activations in response to inputs as well as a frequency decomposition of the inputs.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A recurrent neural network comprising:
an input layer;
a hidden layer; and
an output layer,
wherein the hidden layer comprises hybrid memory cell units, each of the hybrid memory cell units comprising:
a first memory cells of a first type, the first memory cells being configured to remember a first cell state value fed back to each of gates to determine a degree to which each of the gates is open or closed, and configured to continue to update the first cell state value; and
a second memory cells of a second type, each second memory cell of the second memory cells comprising a first time gate configured to control a second cell state value of the second memory cell based on phase signals of an oscillatory frequency, and a second time gate configured to control an output value of the second memory cell based on the phase signals, and each second memory cell of the second memory cells being configured to remember the second cell state value.

2. The recurrent neural network of claim 1, wherein each of the hybrid memory cell units is configured to fully open the first time gate and the second time gate with respect to a predetermined percentage of the first memory cells.

3. The recurrent neural network of claim 2, wherein when a ratio of a number of neuron indices to a total number of neurons included in each of the hybrid memory cell units exceeds the predetermined percentage, the first time gate and the second time gate are further configured to be fully opened and set to a first value.

4. The recurrent neural network of claim 1, wherein the hidden layer comprises remaining neurons which remain after neurons included in each of the hybrid memory cell units are randomly dropped out by a random variable drawn from a uniform distribution between "0" to "1", and
a number of the remaining neurons is determined based on a sparsity threshold.

5. The recurrent neural network of claim 4, wherein in the second memory cells comprising the remaining neurons, a value of a second parameter corresponding to a ratio of a duration of an open phase to an oscillation period of the oscillatory frequency is identical to the sparsity threshold.

6. The recurrent neural network of claim 4, wherein when the random variable is less than the sparsity threshold, the first time gate and the second time gate are further configured to be set to a first value.

7. The recurrent neural network of claim 1, wherein a periodic oscillation is applied to the second memory cells, and
wherein the second memory cell has a fixed phase relationship.

8. The recurrent neural network of claim 7, wherein the periodic oscillation is generated based on a first parameter corresponding to an oscillation period of the oscillatory frequency.

9. The recurrent neural network of claim 8, wherein when a rounded value of a mod operation between a time for the second memory cells and an oscillation period of the second memory cells is zero, the first time gate and the second time gate are further configured to be opened and set to a first value, and
wherein when the rounded value is not zero, the first time gate and the second time gate are further configured to be closed.

10. The recurrent neural network of claim 1, wherein when a current time exceeds a refractory end time in which a state of the first time gate and a state of the second time gate are changed from an off state or a refractory state to an on state, the first time gate and the second time gate are further configured to be opened and set to a first value.

11. The recurrent neural network of claim 10, wherein when the first time gate and the second time gate are set to the first value, the second memory cells are further configured to update the second cell state value.

12. The recurrent neural network of claim 1, wherein the recurrent neural network is configured to receive input values sampled from a continuous input signal.

13. The recurrent neural network of claim 1, wherein the first time gate is controlled based on a first oscillatory frequency and the second time gate is controlled based on a second oscillatory frequency.

14. The recurrent neural network of claim 1, wherein the recurrent neural network is further configured to receive a plurality of input values corresponding to a plurality of sampling rates, and
   wherein each of the phase signals comprises an open phase corresponding to a sampling rate of the plurality of sampling rates.

15. The recurrent neural network of claim 1, wherein the first time gate and the second time gate are further configured to operate based on:
   an open phase comprising a rising phase in which a phase signal changes from a first state to a second state, and a falling phase in which the phase signal changes from the second state to the first state; and
   a closed phase in which the first state of the phase signal is maintained.

16. The recurrent neural network of claim 15, wherein the first time gate is further configured to:
   update the second cell state value based on an input value of each of the hybrid memory cell units, in response to the phase signal being in the open phase; and
   maintain the second cell state value regardless of the input value in response to the phase signal being in the closed phase.

17. The recurrent neural network of claim 15, wherein the second time gate is further configured to update an output value of the second memory cells, in response to the phase signal being in the open phase.

18. The recurrent neural network of claim 1, wherein each of the phase signals comprises a shaped pulse corresponding to a fraction of an oscillation period of the oscillatory frequency.

19. The recurrent neural network of claim 1, wherein the first time gate and the second time gate are further configured to be opened and closed based on at least one from among a first parameter corresponding to an oscillation period of the oscillatory frequency, a second parameter corresponding to a ratio of a duration of an open phase to the oscillation period, and a third parameter corresponding to a phase shift in the oscillatory frequency, and
   wherein the open phase comprises a rising phase in which a phase signal changes from a first state to a second state, and a falling phase in which the phase signal changes from the second state to the first state.

20. The recurrent neural network of claim 19, wherein the first time gate is further configured to be opened and closed based on first independent oscillations in the first time gate, and the second time gate is further configured to be opened and closed based on second independent oscillations in the second time gate, and
   wherein the first independent oscillations and the second independent oscillations are specified by at least one from among the oscillation period, the ratio of the duration of the open phase to the oscillation period, or the phase shift.

21. The recurrent neural network of claim 19, wherein the oscillation period, the ratio of the duration of the open phase to the oscillation period, and the phase shift are trained in advance.

22. The recurrent neural network of claim 1, wherein the hybrid memory cell units are configured to be selectively updated based on input values of hybrid memory cell units that are asynchronously sampled.

23. The recurrent neural network of claim 1, wherein each of the second memory cells further comprises:
   an input gate configured to determine a degree to which an input value of the second memory cell is reflected;
   a forget gate configured to determine a degree to which the second cell state value is forgotten; and
   an output gate configured to determine a degree to which the second cell state value is output, based on a determination of whether the second cell state value is to be maintained or updated,
   wherein the first time gate is further configured to determine, based on the phase signals, whether the second cell state value is to be maintained or updated based on the degree to which the input value is reflected and the degree to which the second cell state value is forgotten, and
   wherein the second time gate is further configured to determine, based on the phase signals, whether the output value is to be maintained or updated based on the degree to which the second cell state value is output.

24. The recurrent neural network of claim 23, wherein the first time gate is further configured to update the second cell state value based on the input value, and
   the second cell state value is controlled by a gating function of the forget gate.

25. The recurrent neural network of claim 19, wherein the first time gate and the second time gate are further configured to be opened and closed based on an oscillation parameterized by the first parameter, the second parameter, and the third parameter.

26. A hybrid memory cell unit comprising:
   a first memory cells configured to remember a first cell state value fed back to each of gates to determine a degree to which each of the gates is open or closed, and configured to continue to update the first cell state value; and
   a second memory cells, each second memory cell of the second memory cells comprising a first time gate configured to control a second cell state value of the second memory cell based on a phase signal of an oscillatory frequency, and a second time gate configured to control an output value of the second memory cell based on the phase signal, and each second memory cell of the second memory cells being configured to remember the second cell state value.

27. The hybrid memory cell unit of claim 26, wherein the hybrid memory cell unit is configured to fully open the first time gate and the second time gate with respect to a predetermined percentage of the first memory cells.

28. The hybrid memory cell unit of claim 27, wherein when a ratio of a number of neuron indices to a total number of neurons included in the hybrid memory cell unit exceeds the predetermined percentage, the first time gate and the second time gate are further configured to be fully opened and set to a first value.

29. A recurrent neural network comprising:
   an input layer;
   a hidden layer; and
   an output layer,
   wherein the hidden layer comprises hybrid memory cell units, the hybrid memory cell units comprising:
      a plurality of first memory cells configured to remember a first cell state value fed back to each of gates to determine a degree to which each of the gates is open or closed, and configured to continue to update the first cell state value; and
      a plurality of second memory cells comprising a plurality of first time gates and a plurality of second time gates, the second plurality of memory cells being configured to remember a second cell state value, wherein each second memory cell of the plurality of second memory cells comprises a respective first time gate of the plurality of first time gates, the first time gate being configured to control the second cell state value of the second memory cell based on phase signals of an oscillatory frequency, and a respective second time gate of the plurality of second time gates, the second time gate being configured to control an output value of the second memory cell based on the phase signals.

* * * * *